US011623388B2

(12) United States Patent
Soriano Fosas et al.

(10) Patent No.: US 11,623,388 B2
(45) Date of Patent: Apr. 11, 2023

(54) ADDITIVE MANUFACTURING METHODS FOR PRINTING TAMPER EVIDENT SECURITY STRUCTURES WITH HORIZONTAL AND VERTICAL SERPENTINE PATTERNS

(71) Applicant: HEWLETT-PACKARD DEVELOPMENT COMPANY, L.P., Houston, TX (US)

(72) Inventors: David Soriano Fosas, Vancouver, WA (US); Juan Manuel Zamorano, Sant Cugat del Valles (ES); Michele Vergani, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 400 days.

(21) Appl. No.: 16/075,918

(22) PCT Filed: Jul. 28, 2017

(86) PCT No.: PCT/US2017/044462
§ 371 (c)(1),
(2) Date: Aug. 6, 2018

(87) PCT Pub. No.: WO2019/022776
PCT Pub. Date: Jan. 31, 2019

(65) Prior Publication Data
US 2021/0213677 A1    Jul. 15, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/393* (2017.08); *B33Y 10/00* (2014.12);
(Continued)

(58) Field of Classification Search
CPC ..... B29C 64/165; B29C 64/393; B33Y 10/00; B33Y 50/02; B33Y 80/00; B29K 2101/12; B29K 2507/04; G06K 19/067
See application file for complete search history.

(56) References Cited

U.S. PATENT DOCUMENTS 7,054,162 B2    5/2006  Benson et al.
7,978,070 B2    7/2011  Hunter
(Continued)

FOREIGN PATENT DOCUMENTS

WO          2016023961 A1      2/2016
WO       WO-2016145309 A1 *   9/2016
WO       WO-2016203409 A1 *  12/2016  ........... A61L 27/227

*Primary Examiner* — Joseph S Del Sole
*Assistant Examiner* — Guy F Mongelli
(74) *Attorney, Agent, or Firm* — Michael Dryja

(57) ABSTRACT

Examples relate to methods of printing a 3D printed tamper evident security structure for protecting a feature; the method comprising repeatedly: depositing a layer of build material; doping one or more than one region of the layer of build material using a dopant to influence a respective electrical attribute of one or more than one region associated with a graph of the structure; and agglomerating one or more than one selected portion of the layer of the build material, including the one or more than one doped region of the layer of build material, to form progressively the graph with a predetermined measurable electrical characteristic.

11 Claims, 17 Drawing Sheets

(51) Int. Cl.
  *B33Y 50/02* (2015.01)
  *B33Y 80/00* (2015.01)
  *B29C 64/393* (2017.01)
  *B29K 101/12* (2006.01)
  *B29K 507/04* (2006.01)

(52) U.S. Cl.
  CPC .............. B33Y 50/02 (2014.12); B33Y 80/00 (2014.12); *B29K 2101/12* (2013.01); *B29K 2507/04* (2013.01)

(56) References Cited

U.S. PATENT DOCUMENTS

| | | |
|---|---|---|
| 8,637,985 B2 | 1/2014 | Bindrup et al. |
| 9,521,764 B2 | 12/2016 | Steiner |
| 2002/0020945 A1* | 2/2002 | Cho ................. B29C 64/165 264/460 |
| 2009/0296223 A1* | 12/2009 | Werner ............. G02B 3/0087 359/708 |
| 2013/0089642 A1* | 4/2013 | Lipson ............. B29C 64/106 426/115 |
| 2015/0024169 A1* | 1/2015 | Martin ............. B29C 64/135 264/460 |
| 2015/0163933 A1 | 6/2015 | Steiner |
| 2017/0135237 A1 | 5/2017 | Brodsky et al. |
| 2017/0156223 A1 | 6/2017 | Fisher et al. |
| 2017/0173879 A1 | 6/2017 | Myerberg et al. |
| 2017/0226362 A1* | 8/2017 | Fratello ............. G01L 1/2287 |
| 2017/0317165 A1* | 11/2017 | Brandt ............. H01L 29/0623 |
| 2019/0054691 A1* | 2/2019 | Abbott, Jr. ........ B22F 1/107 |

\* cited by examiner

ADDITIVE MANUFACTURING METHODS FOR PRINTING TAMPER EVIDENT SECURITY STRUCTURES WITH HORIZONTAL AND VERTICAL SERPENTINE PATTERNS

BACKGROUND

Tamper evident or anti-tamper protection can be used to guard against various attacks such as, for example, probing attacks. Tamper evident protection can be used to protect various devices and information from such attacks. A mesh can be used to house a device, such as a chip, to be protected. Monitoring the mesh for interruptions or short-circuits allows the mesh to be used as a powered sensor.

An example of a use of anti-tamper protection relates to, for example, asymmetrical cryptography systems that are used to facilitate secure transactions.

Electronic devices that are used to perform such secure transactions will use public and private keys. Storing a private key within an information device, such as, for example, a chip, can create a potential vulnerability.

To protect against opportunities to interrogate such information devices with a view to obtaining the private key, supposedly secure enclosures have been developed that surround the information device. The integrity of such a secure enclosure is periodically, aperiodically or continuously determined and, if found to be compromised, the associated private key is invalidated and no longer used for secure transactions.

Other examples of situations in which anti-tamper protection can be employed are pre-payment meters, subscription services, such as pay-per-view services, electronic document protection, mobile telephone protection, smart card protection and the like. Still further, anti-tamper protection can be used to guard against reverse engineering.

BRIEF DESCRIPTION OF THE DRAWINGS

Example implementations be described, by way of example, with reference to the accompanying drawings in which.

DETAILED DESCRIPTION

Figure 1:
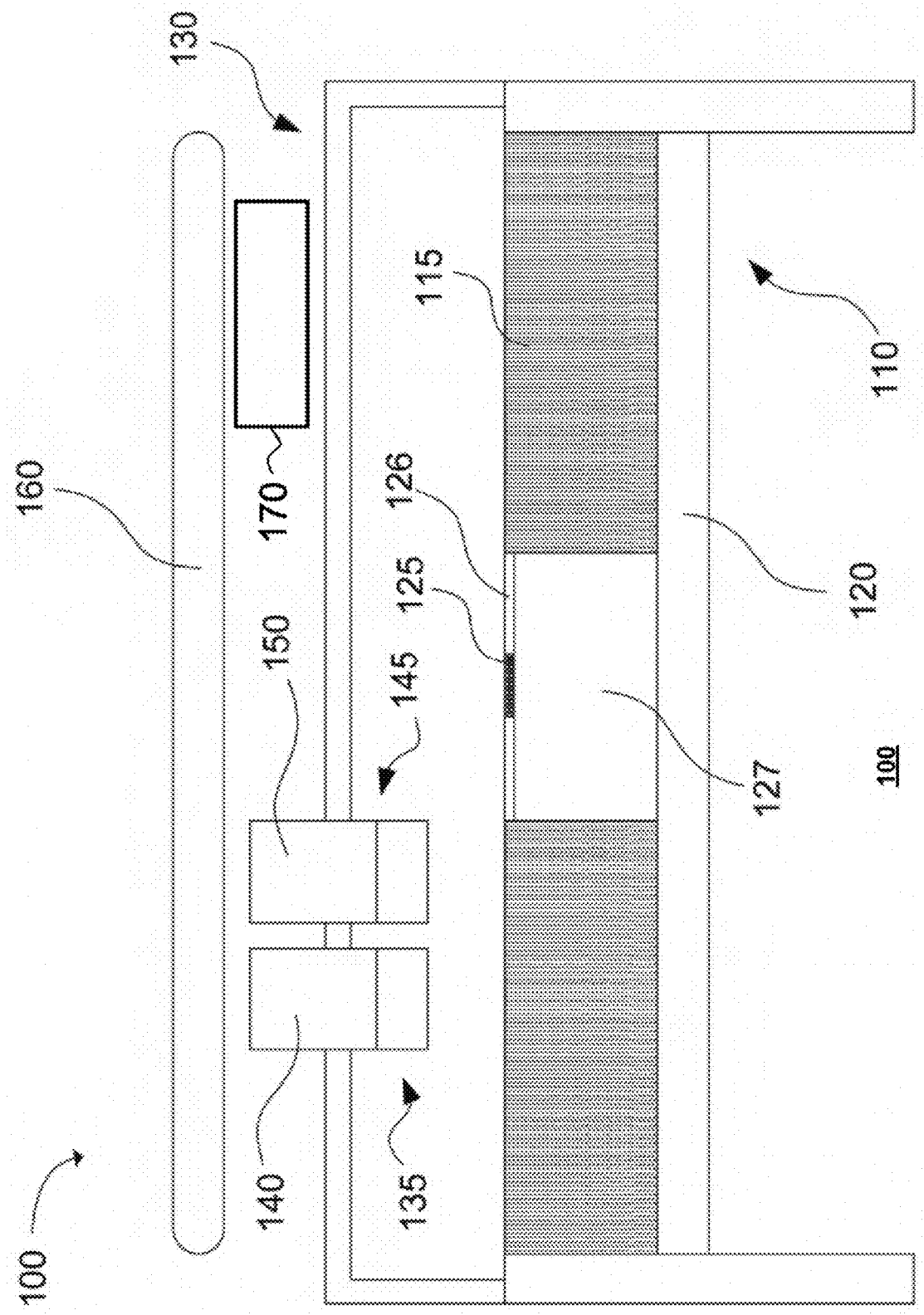
FIG. 1 is a schematic view of a 3-dimensional (3D) printing system according to examples.

FIG. 1 shows an example of 3D printing system 100. The system may include a removable build chamber 110 on which a layer of build material 115 can be deposited. The build material can be, for example, powder. In the example shown, the build chamber has a build platform 120 bearing layers of build material to be selectively solidified to form each layer of a 3D part to be printed. The 3D printed part can include a doped layer 126, including one or more than one doped region or portion 125, applied to a part body 127.

The system 100 can also comprise a inkjet printer 130 that has a first inkjet pen 135 in communication with a reservoir 140 of a dopant composition or agent. The first inkjet pen can print the dopant agent onto the layer of build material. A second inkjet pen 145 can be provide that is in communication with a reservoir 150 of a fusing composition or agent 150. The second inkjet pen can print the fusing agent onto the layer of build material. After the fusing agent has been printed onto the layer of build material, a fusing lamp 160 can be used to heat the build material. Build material bearing fusing agent absorbs more energy than build material without fusing agent such the former agglomerates whereas the latter does not fuse.

To achieve good selectivity between the fused and unfused portions of the build material layer, the fusing agent can absorb enough energy to increase the temperature of any build material on the build platform above the melting or softening point of the build material, while unprinted portions of the layer of build material remain below the melting or softening point. It will be appreciated that such portions can be examples of one or more than one region of base material doped with a dopant.

The operation of the 3D printer is under the controller of a controller 170. The controller 170 can comprise one or more than one processor for executing machine-readable or machine-executable instructions for realizing any and all examples herein. Accordingly, examples provide at least one or more than one of circuitry, hardware or software for implementing a controller, taken jointly and severally in any and all permutations. The controller 170 is arranged to implement any control and methods described herein.

Figure 2:
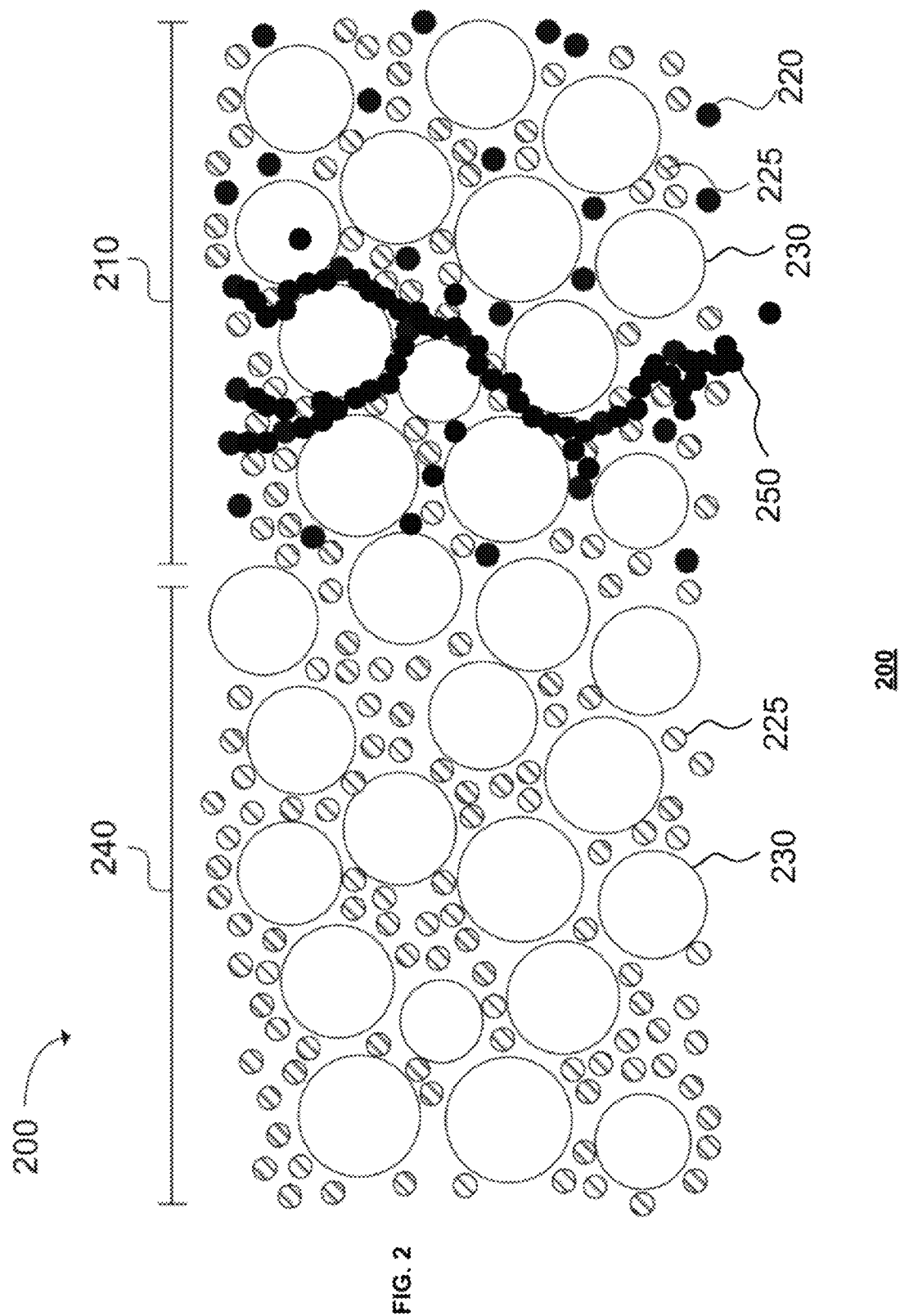
FIG. 2 is a schematic view of a layer of a build material with a dopant printed on a portion of the layer in accordance with example implementations.
Figure 3:
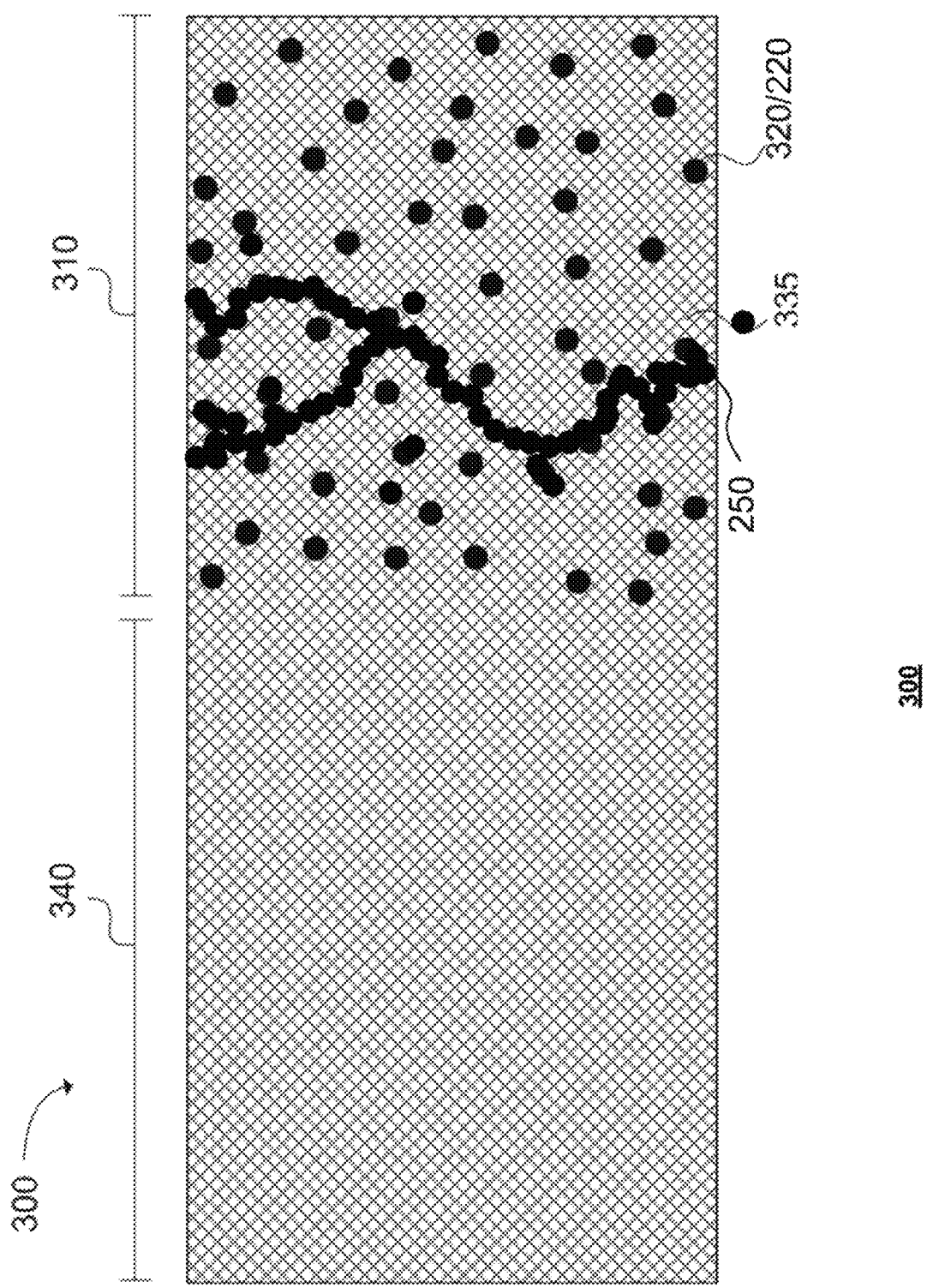
FIG. 3 is a view of the layer of FIG. 2 after the layer has been fused in accordance with example implementations.

Incorporating a dopant into a 3D printed part described herein is illustrated, by way of example, in FIGS. 2 and 3. FIGS. 2 and 3 show views of a layer of build material 200 that has been printed with at least one, or both, of a dopant composition or agent or a fusing composition. The build material can be, for example, a polymer powder. FIG. 2 shows a portion of the layer of build material 200 after being printed but before being fused, and FIG. 3 shows the coalesced or otherwise agglomerated build material layer 300 after being fused.

In FIG. 2, a first portion 210 of the build material layer 200 has been printed with a dopant composition or agent containing a dopant 220 and with fusing agent 225. The dopant 220 penetrates into the spaces between the powder particles 230. Optionally, a second portion 240 of the powder build material has been printed with a fusing agent 225, but without the dopant 220. Thus, as shown, a portion of the printed layer includes the dopant 220. It can be seen that a path 250 through the base material has been established by the dopant 220. The path 250 represents an example of one or more than one region of doped base material exhibiting at least one of a predetermined electrical attribute or a predetermined measurable electrical characteristic.

As shown in FIG. 3, when the build material layer 300 is fused, cured or otherwise agglomerated by exposure to electromagnetic radiation, the dispersed dopant 220, 320 can be entrapped throughout a portion of a matrix 335 formed by fused, cured or otherwise agglomerated powder particles in a first portion 310. Therefore, the dopant entrapped in the matrix of fused build material can form a doped region. In the second portion 340 of the build material layer, the build material particles are fused in the absence of a dopant. It should be noted that FIGS. 2 and 3 show a 2-dimensional cross-section of a portion of a doped region. It can be appreciated that the path 250 of doped build or base material is also illustrated. Further, the dopant is illustrated in FIGS. 2 and 3 as completely penetrating the layer of polymer build material. However, in any or all examples, the dopant 220, 320 can extend into the region to a depth greater than about 20%, about 50%, about 70%, or about 90% of the thickness of the layer, or to some other depth, or across the surface of the build material.

In any or all examples, the amount of dopant deposited can be adjusted by printing the dopant composition or agent in multiple passes. In one example, a single pass of a printhead can be sufficient. Alternatively, additional passes can be applied to increase the amount of dopant applied. In further examples, the amount of dopant dispensed can be adjusted by adjusting the drop weight of the printhead either through resistor design or by changing firing parameters. Thus, with a greater drop weight, a greater amount of the dopant can be printed with each drop fired. However, in some cases jetting too large an amount of agent in a single pass can lead to lower print quality because of printing liquid spreading. Therefore, in any or all examples multiple passes, or multiple firings, can be used to increase the variation of doping in selected regions. Varying the doping in one or more than one region can, in turn, vary at least one, or both, of the predetermined electrical attribute or the predetermined measurable electrical characteristic in said one or more than one region.

Figure 4:
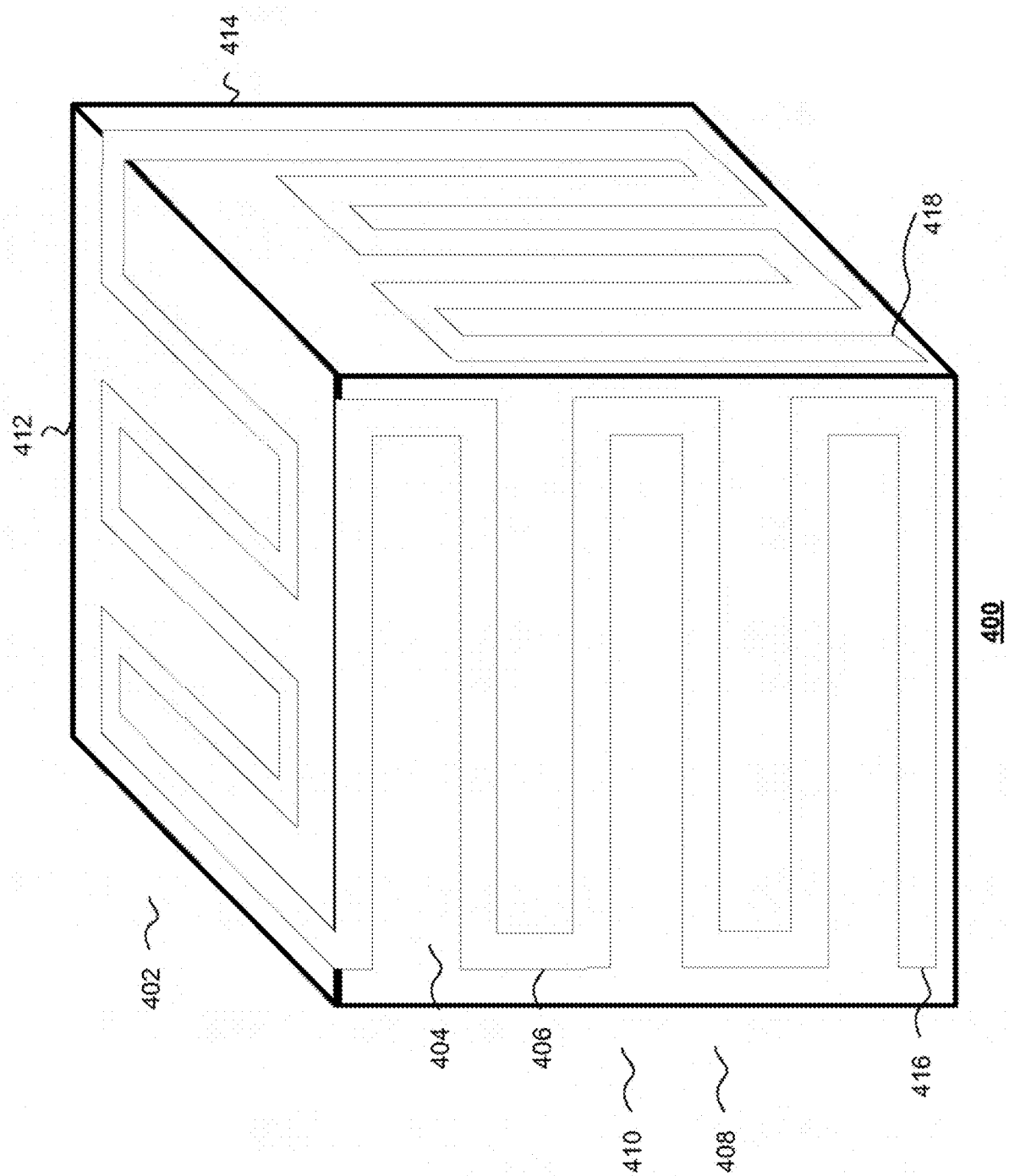
FIG. 4 is a view of a tamper evident security structure according to examples.

Referring to FIG. 4, there is shown a view 400 of a tamper evident security structure 402. The tamper evident security structure 402 has been created by 3D printing using, for example, the 3D printer 100 as described above with reference to FIG. 1. The 3D printed tamper evident security structure 402 is formed from a base material 404. The base material 404 is an example of a build material.

Portions of the base material 404 have been doped, using a dopant, to create one or more regions of doped base material 406. The one or more regions of doped base material 406 is an example, or are examples, of one or more than one region having a predetermined electrical attribute that is different to a corresponding electrical attribute of the base material 404. The predetermined electrical attribute can be at least one of conductance, resistance, capacitance or inductance taken jointly and severally in any and all permutations. For instance, example implementations can be realised in which the one or more regions of doped base material 406 comprise the base material 404 doped with a dopant to increase conductance or reduce resistance of the doped base material 406 relative to the undoped base material 404 or visa versa. Additionally, or alternatively, the doped base material 406 can be printed to create at least one of a predetermined inductance or a predetermined capacitance.

In any, or all, example implementations described in this application, examples of dopants can comprise at least one of carbon, carbon black, carbon fibres, nanoparticles or graphene taken jointly and severally in any and all permutations.

In the example implementation shown in FIG. 4, the doped base material 406 comprises carbon black, which influences the conductivity or resistivity of the doped base material 406 relative to the undoped base material 404. It will be appreciated that doping the base material 404 with carbon black will decrease the resistance, or increase the conductance, of the doped base material 406 relative to the undoped base material 404.

Selectively doping regions of the base material 404 to create one or more than one region of doped base material 406 allows a complex structure to be constructed using the 3D printer 100. The one or more regions of doped base material 406 can be referred to as traces or pathways having respective predetermined electrical attributes. In the example implementation depicted, the traces or pathways define reciprocating or serpentine pathways on one or more than one facet of a volume 408 of the tamper evident security structure 402. In any, or all, example implementations described in this application, the respective predetermined electrical attributes can comprise at least one of conductance, resistance, capacitance or inductance taken jointly and severally in any and all permutations.

In the example implementation depicted in FIG. 4, the traces or pathways span all faces of the volume 408 as can be appreciated from the three visible faces 410, 412, 414 of the volume 408. The traces or pathways of each face are at least one of physically or electrically coupled to form a graph exhibiting an overall predetermined measurable electrical characteristic. The overall predetermined measurable electrical characteristic is exhibited between two respective contact or end points 416, 418. In the example shown in FIG. 4, the graph can exhibit an overall predetermined resistivity or an overall predetermined conductivity.

A graph is a structure that comprises one or more than one region of doped build material. A simple trace of doped build material between two points is an example of a simple graph. Graphs can comprise multiple coupled or separate regions of doped material. A mesh is an example of a graph. A tree or root structure is an example of a graph. A random walk trace between two points is an example of a graph.

In any or all examples, the one or more than one region of doped base material can comprise a planar structure or sheet of doped base material. Example implementations can be realised in which a plurality of such structures or sheets are provided. Such a sheet or such a number of sheets can provide a respective current carrying capacity that is greater than, for example, a single trace or track of conductive material. Multiple sheets can be electrically isolated or electrically coupled.

One or more than one other face of the volume 408 can bear corresponding or similar traces or pathways that exhibit an overall respective predetermined measurable electrical characteristic. The respective predetermined measurable electrical characteristic can be the same as, or be different to, the above described predetermined measurable electrical characteristic of the graph between the contact or end points 416, 418.

The above graph or graphs define a protected volume 408 that cannot easily be accessed without interfering with, or damaging, one or more than one region of doped base material 406, that is, any attempted access to the protected volume 408 will result in a detectable change in the predetermined measurable electrical characteristic exhibited between the contact or end points 416, 418.

The traces or pathways have been shown in FIG. 4 as lying on the three faces 410, 412, 414 of the volume 408. However, example implementations are not limited to such an arrangement. Example implementations can be realised in which the three faces define the extent of the protected within the volume 408. It will be appreciated, therefore, that traces or pathways that define a protected volume can be embedded within an overall volume of the base material 404. It will be appreciated that such an overall volume of the base material 404 is an example of a volume of base material having embedded therein one or more than one doped region having a predetermined electrical attribute that is different to a corresponding electrical attribute of the base material.

Figure 5:
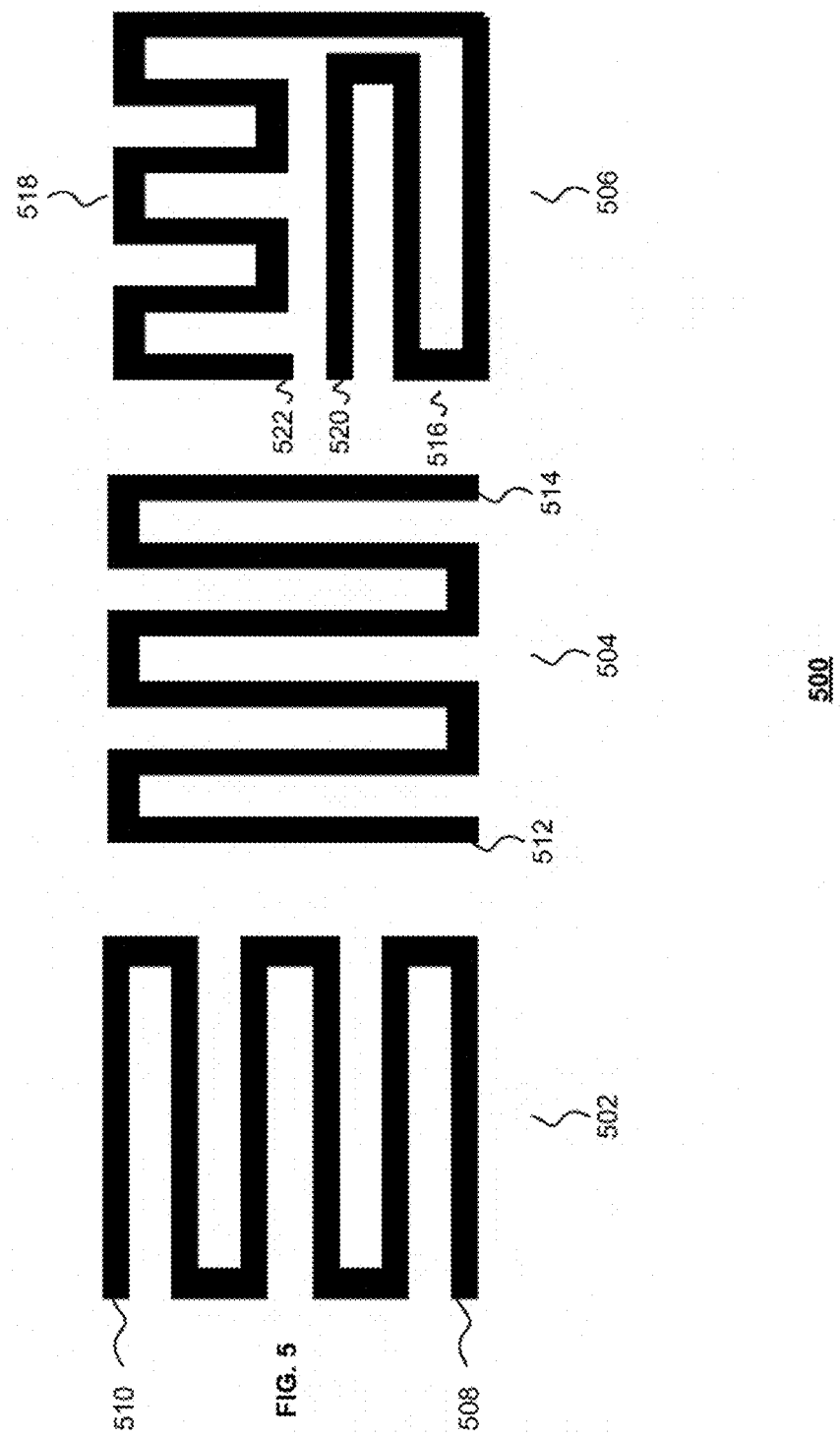
FIG. 5 is a view of multiple layouts and orientations of doped regions associated with a tamper evident security structure according to examples.

Referring to FIG. 5, there is shown a view 500 of a number 502, 504, 506 of possible traces or pathways. The traces or pathways 502, 604, 506 are examples of one or more than one region of doped base material having a predetermined electrical characteristic or attribute that is different to a corresponding predetermined electrical attribute or characteristic of the undoped build material. A first trace 502 depicts a reciprocating or serpentine trace oriented in a first direction. The first direction may be a horizontal direction. The first trace 502 will exhibit a predetermined electrical attribute or a predetermined measurable electrical characteristic as measured between contact or end points 508, 510. The second trace 504 also shows a reciprocating or serpentine trace oriented in a second direction. The second direction can be a vertical direction. The second trace 504 will exhibit a predetermined electrical attribute or a predetermined measurable electrical characteristic as measured between contact or end points 512, 514. The third trace 506 comprises a mixture of differently oriented reciprocating or serpentine traces. A first portion 516 of the third trace 506 comprises a reciprocating or serpentine trace oriented in the first direction. The first portion 516 is coupled to a second portion 518 comprising a reciprocating or serpentine trace oriented in the second direction. The third trace 506 is arranged to exhibit a predetermined electrical attribute or a predetermined measurable electrical characteristic as measured between contact or end points 520, 522. The difficult of probing or circumventing a trace can be related to the resolution of the spacing between traces, that is, between regions of doped base material, and the resolution of the traces per se.

It will be appreciated that the one or more than one region of doped base material, that is, the traces 502, 504, 506 can be arranged to be a complex graph that can be chosen or determined to have at least one of any predetermined electrical attribute, predetermined measurable electrical characteristic, any orientation within a facet of a protected volume, any orientation within a 3D protected volume, any width, height, depth or length, or at a resolution and/or spacing determined by the resolution of the 3D printer 100, taken jointly and severally in any and all permutations.

Therefore, the dimensions and spacing of the doped base material and undoped base material are governed by the printing resolution of the 3D printer 100. Any and all examples can be realised in which the physical dimensions, resolution and/or spacing is of the order of micrometers. Example implementations can be realised in which the physical dimensions, resolution and/or spacing are of the order of 100 micrometers. Therefore, examples can be realised in which a spacing or printable, or fusing resolution of 100 micrometer by 100 micrometers can be realised. The spacing between doped regions and/or the dimensions of the doped regions can be varied. It will be appreciated that the smaller the dimensions used in fabricating a graph, the more challenging it will be to circumvent or otherwise penetrate the protection afforded by the graph. The spacing between the graph features can be varied according to a desired level of protection.

Figure 6:
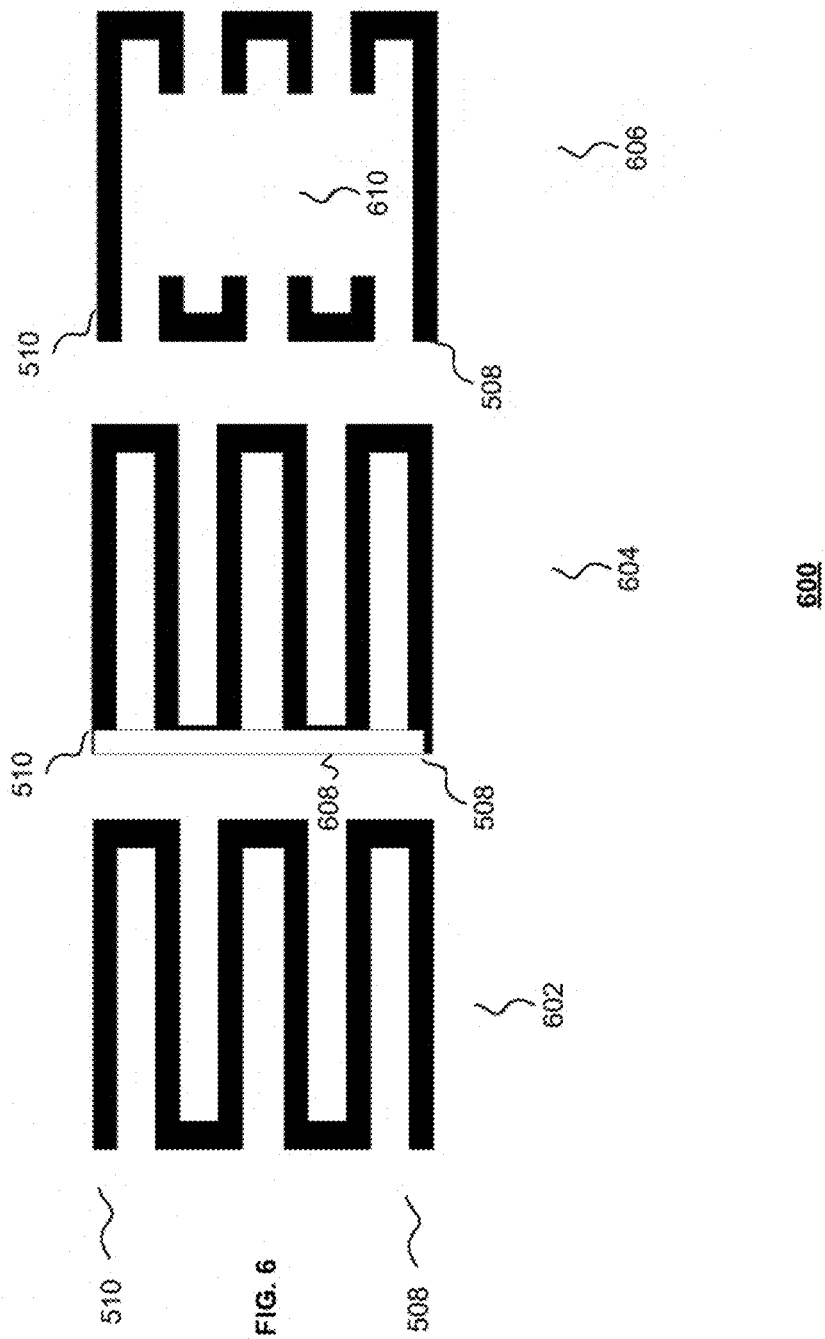
FIG. 6 is a is view demonstrating how doped regions can be compromised according to examples.

Referring to FIG. 6, there is shown a view 600 comprising multiple instances 602, 604, 606 of the first trace 502 described above with reference to FIG. 5. The predetermined electrical attribute or predetermined measured electrical characteristic, determined between contact or end points 508, 510, will be at a predetermined measureable value or values. The first instance 602 of the first trace 502 is shown in an uncompromised or unadulterated form. The second instance 604 of the first trace 502 is shown as having been compromised. The nature of the compromise 608 has been demonstrated as a short circuit between contact or end points 508, 510 relative to a designed or expected value. The short-circuit 608 will be detectable by a change in the predetermined electrical attribute or the predetermined measurable electrical characteristic exhibited between the contact or end points 508, 510. The third instance 606 of the first trace 502 is also shown as bearing a compromise 610. The nature of the compromise 610 is shown as break in one or more than one region of the trace 502. Again, any such discontinuity in the trace 502 will be exhibited as a change in at least one of the predetermined electrical attribute or predetermined measurable electrical characteristic of the trace 502 as measured between the contact or end points 508, 510.

Figure 7:
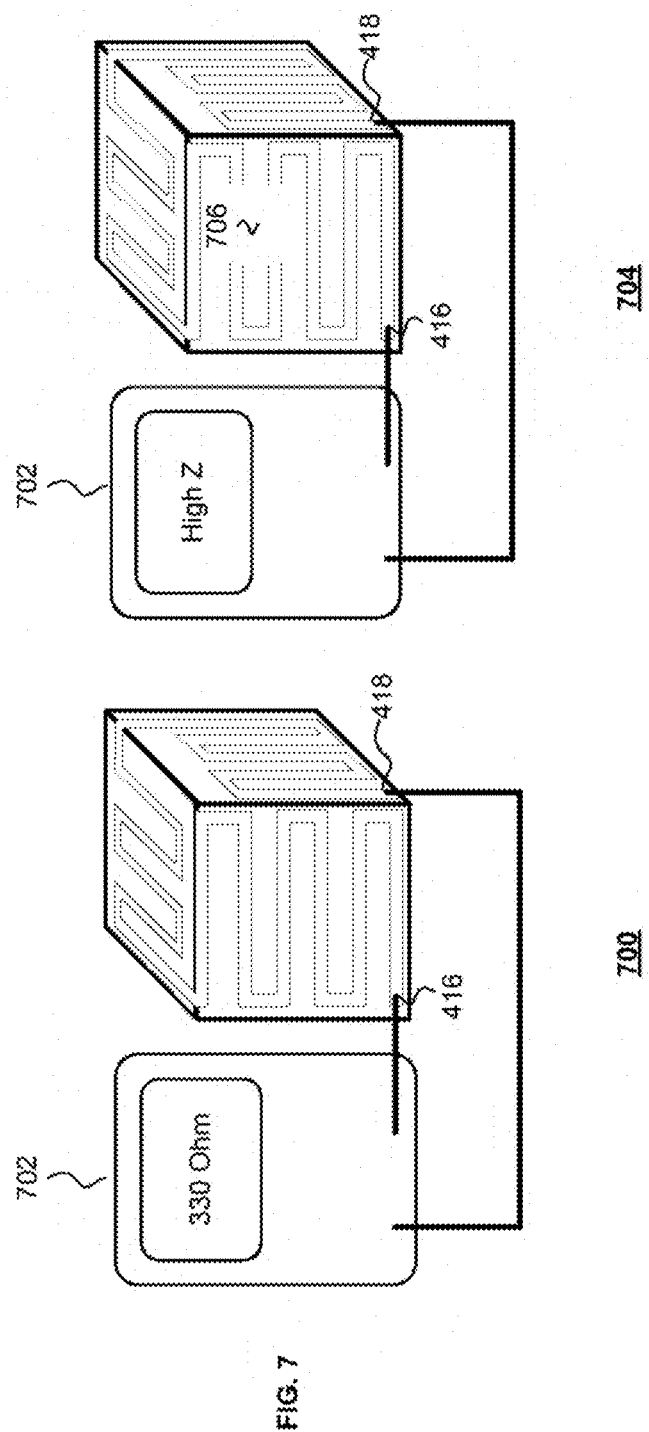
FIG. 7 is a view of testing a tamper evident security structure according to examples.

FIG. 7 shows a view 700 of an ohmmeter 702 being used to determine the resistivity or impedance of the overall trace between contact or end points 416, 418 of the structure depicted in FIG. 4. It will be appreciated, since the overall trace is uncompromised or unadulterated, that the ohmmeter 702 will give an anticipated or expected reading, that is, it will give an anticipated or expected predetermined measurable electrical characteristic. In the given example implementation, the predetermined measurable electrical characteristic is shown as being 330 ohms. Also shown in FIG. 7 is a view 704 of the ohmmeter 702 being used to determine the resistivity or impedance of the overall trace between contact or end points 416, 418 of the structure depicted in FIG. 4. Since the overall trace is compromised by a break 706, the ohmmeter 702 will exhibit a different, that is, higher, resistivity or impedance, that is a different predetermined measureable electrical characteristic.

Detecting a compromised or an adulterated graph provides an indication that an unauthorised interrogation or unauthorised investigation of, for example, an information device, housed within, or protected by, the overall graph might have been attempted.

Figure 8:
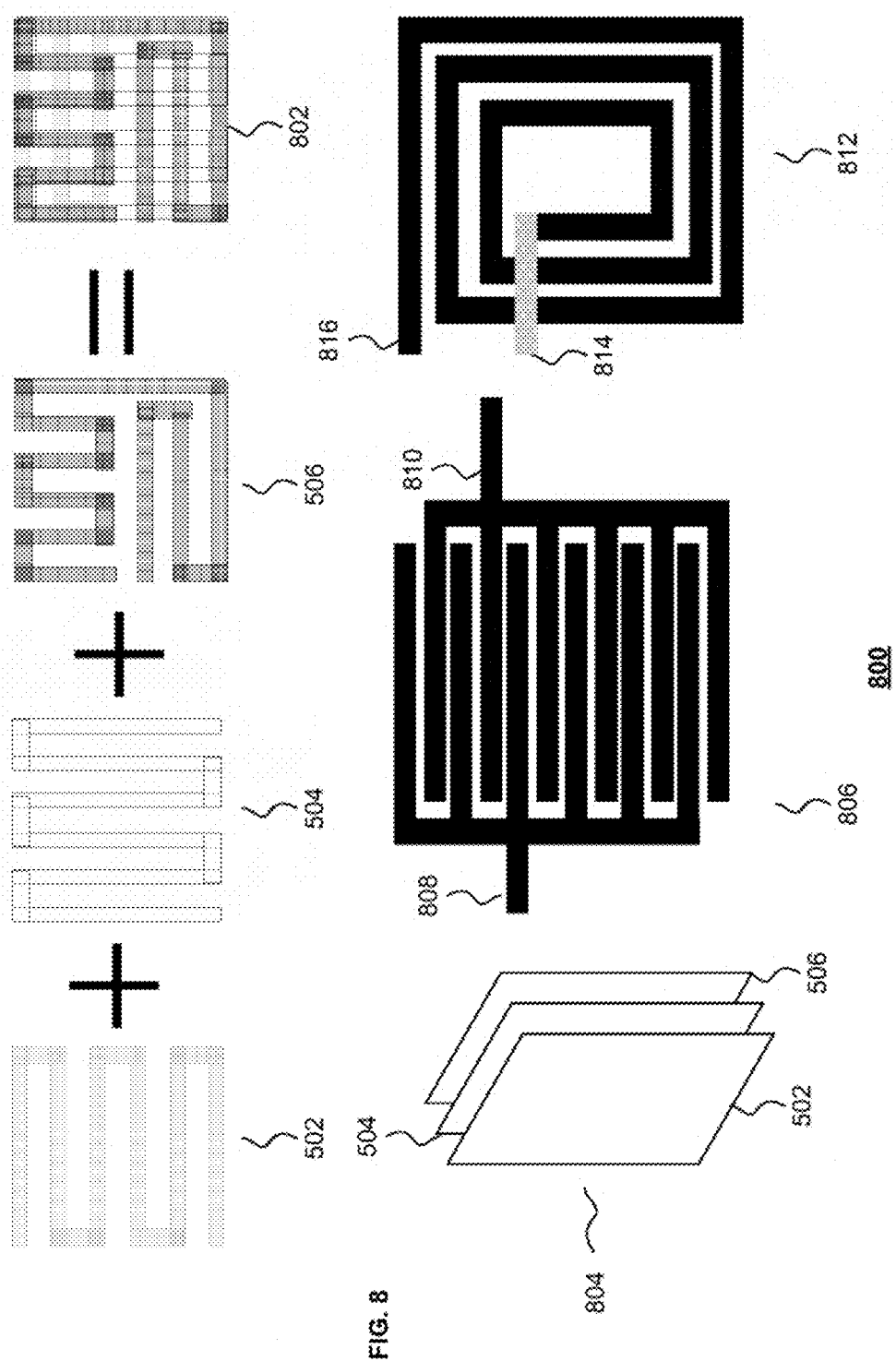
FIG. 8 shows a number of tamper evident security structures according to examples.

FIG. 8 shows a view 800 of the three traces 502, 504 and 506, described above with reference to FIG. 5, being used in combination. The three traces 502, 504, 506 are aligned as can be appreciated from the collection of overlapping traces 802. Although the collection of overlapping traces 802 has been shown with the three traces 502, 504, 506 being completely aligned, example implementations can alternatively, or additionally, be implemented in which selected traces are aligned. In such an example implementation, one or more than one of the three traces 502, 504, 506 are not aligned, that is, they are partially overlapping. The isometric view 804 of the collection of overlapping traces 802 illustrates the relatively close proximity of the traces 502, 504, 506 to one another. Although the isometric view 804 shows the collection of overlapping traces 802 as being relatively uniformly disposed, example implementations can be realised in which the traces 502 to 506 are not regularly spaced relative to one another, or in which a selected number of traces are regularly spaced relative to one another while others are not regularly spaced relative to one another. Furthermore, it can be appreciated that the traces 502, 504, 506 have been shown as being parallel to one another. Example implementations are not limited to such parallel arrangements. Examples can be realised in which one or more than one of the traces is oriented at a predetermined angle other than parallel to one or more than one other trace.

It can be appreciated that closely disposed traces such as, for example, traces 502 and 504 can exhibit capacitance between them. The capacitance between such closely disposed traces can vary with the degree of overlap, or overlapping area, of the traces, the separation between the traces and the dielectric between the traces. It will be appreciated that example implementations can be implemented in which the dielectric is the undoped base material 408. Furthermore, if one or more of the traces 502, 504, 506 are arranged in, for example, a spiral arrangement, an inductor can be formed.

Multiple inductors can give rise to mutual inductance as a possible predetermined measurable electrical characteristic, or as at least part of such a predetermined measurable electrical characteristic.

Although the above example implementation has made reference to a dielectric being used to realised the undoped base material 408, examples are not limited to such an arrangement. Examples can be realised in which the dielectric is realised using a base material doped with a dopant that increases or decreases the dielectric constant of the doped base material.

Also shown in FIG. 8 is a capacitive graph 806. The capacitive graph 806 is formed from first 808 and second 810 parts. The first 808 and second 810 parts can comprise interdigitated fingers. In the example show, each part 808, 810 comprises six such fingers. The capacitive graph 806 comprises a respective predetermined electrical capacitance or a predetermined measureable electrical capacitance. FIG. 8 additionally shows an inductive graph 812. The inductive graph is arranged to provide a respective predetermined electrical inductance or a predetermined measurable electrical inductance between contact or end points 814, 816. The contact or end point 814 is shown in a light grey to distinguish it from the underlying spiral traces. The contact or end point 814 is spaced apart from the underlying traces by undoped base material, but is connected to the centre of the spiral by a riser formed normally to the spiral from doped base material using the same dopant as used to create the rest of the inductive graph. Both of the above capacitance and inductance are examples of at least one, or both, of a predetermined electrical attribute or a predetermined measurable electrical characteristic.

Figure 9:
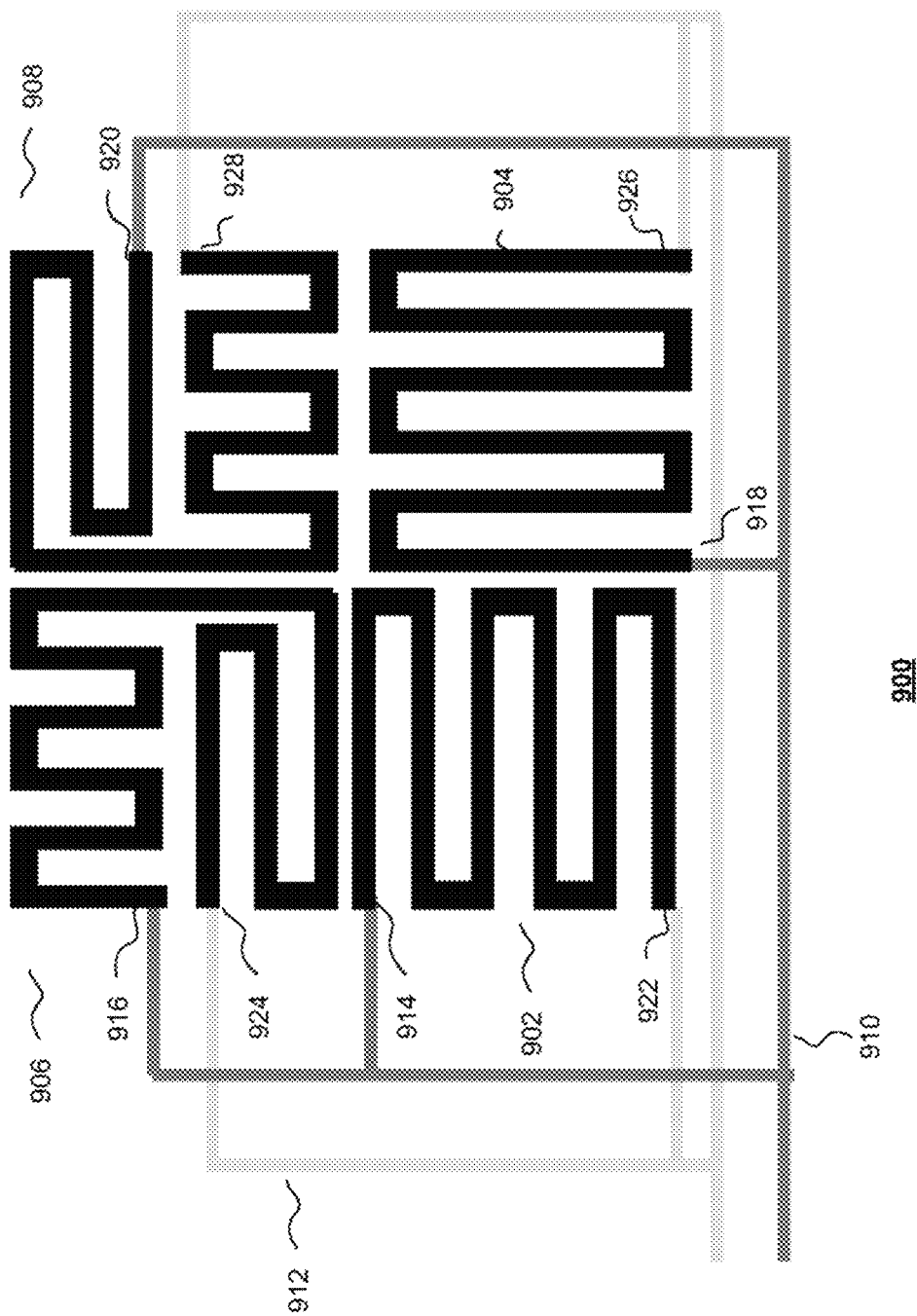
FIG. 9 depicts a number of tamper evident security structures according to examples.

Referring to FIG. 9, there is shown a view 900 of a number of coplanar traces 902 to 908. The first trace 902 can be identical to the above described trace 502. The second trace 904 can be identical to the above described trace 504. The third and fourth traces 906, 908 can be identical to the above described trace 506; albeit differently orientated relative to one another. Also shown in FIG. 9 are endpoint contact traces 910, 912 that are connected to the contact or end points 914 to 920 and 922 to 928. The endpoint contact traces 910, 912 can be used to determine at least one of the predetermined electrical attribute or predetermined measurable electrical characteristic of the coplanar traces 902 to 908.

Although the traces 902 to 908 have been described as coplanar, example implementations are not limited to such an arrangement. Examples can be realised in which one or more than one trace is not coplanar with zero, one or more than one other trace. The traces can be arranged in a non-coplanar manner. Traces arranged in such a non-coplanar manner can be either parallel to one another or not parallel to one another. Example implementations can be realised in which one or more than one trace is arranged in an unparallel manner relative to one or more than one other trace. Additionally, or alternatively, examples can be realised in which one or more than one trace is arranged in parallel relative to one or more than one other trace. Example implementations can be realised in which the traces are arranged in a mixture of parallel or unparallel orientations.

It can be appreciated that FIG. 9 demonstrates how the graphs of FIG. 8 can be connected to realise a dense overall graph with known measurable electrical characteristics.

Figure 10:
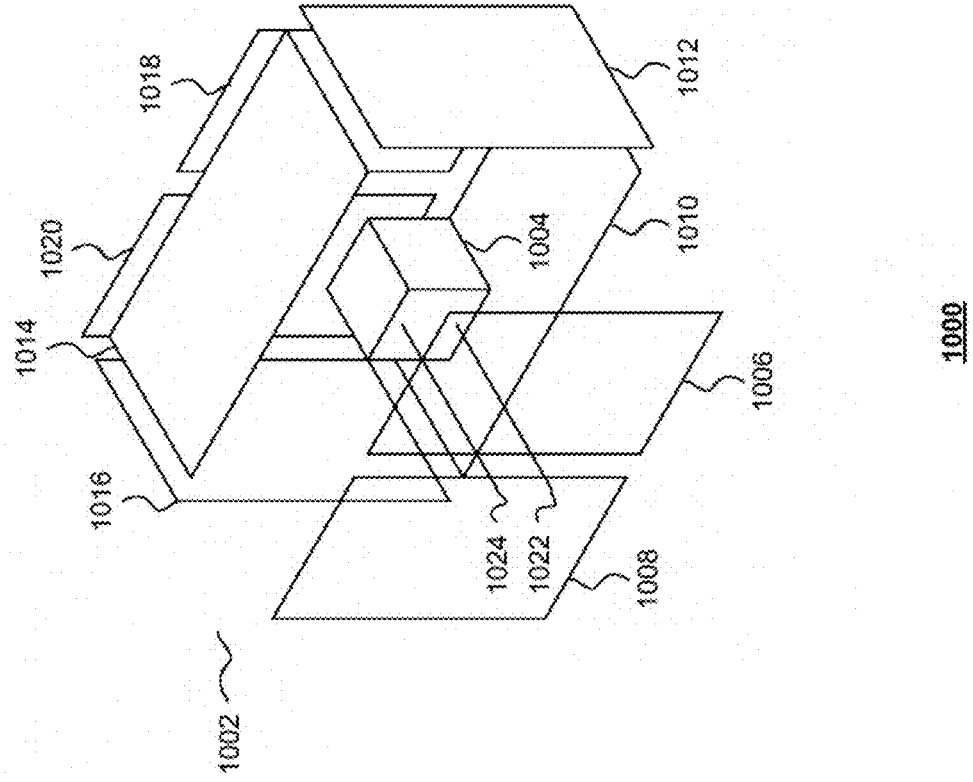
FIG. 10 is a view of a tamper evident security structure formed from a number of tamper evident security structures according to examples.

FIG. 10 shows a view 1000 of a printed 3D tamper evident security structure 1002 for protecting an information device 1004. The structure 1002 is depicted as comprising a number of planes 1006 to 1020. The structure is an example of a 3D printed tamper evident security structure. The information device 1004 comprises one or more than one line for accessing or otherwise communicating with the information device 1004. In the illustrated example, two such lines 1022, 1024 are shown. The lines can relate to at least one, or both, of power lines supplying power to the device or communication lines for communicating with the device. The communication lines 1022, 1024 can be used to read information stored within the information device 1004 and/or to write information to the information device 1004. The information may comprise, for example, sensitive information such as an encryption key that can be used for at least one of encrypting or decrypting data. Therefore, for example, the data could comprise a private key of an asymmetrical encryption system.

It can be appreciated that the facets have been illustrated as being both regular and planar. However, examples can be realised in which the facets are at least one, or both, of irregular or nonplanar. Furthermore, it will be appreciated that the facets have been shown as being substantially uniform planes. However, this is for the purposes of clarity to demonstrate housing of the information device 1004. In practice, each of the facets will exhibit one or more than one region of doped base material, that is, each of the facets will exhibit respective traces. One or more than one of the respective traces can be different to one or more than one of the other respective traces. Additionally, or alternatively, one or more than one of the respective traces can be the same as one or more than one of the other respective traces. For instance, the traces for the planes 1006 to 1020 can be selected from a predetermined set or database of traces. For example, the three traces 502, 504, 506 can form a set or database of traces from which selections can be made to realise the structure 1002.

The security graph will be progressively constructed by depositing a layer of build material, doping one or more than one region of the build material associated with the graph per se and then fusing at least one of the build material and the doped build material to realise the structure. It will be appreciated that the device to be protected can be inserted into the structure in a number of ways. For example, the graph can be at least partially constructed to a point at which the device to be protected can be inserted, whereupon construction of the complete graph is paused while the device is inserted into the partially constructed graph. Inserting the device into the partially constructed graph can comprise one or more than one of securely positioning the device within the partially constructed structure or providing at least one, or both, of power and communications lines to the device, taken jointly and severally in any and all permutations. Once the device has been suitably positioned, the construction of the remainder of the security structure can be resumed so that the graph or graphs are constructed around the device.

Furthermore, any and all examples can be realised in which the security structure is constructed in parts and assembled with the device post-printing. For instance, the security structure could be constructed in two parts that define a housing for the device to be protected. The two parts can be arranged to be complementary. For instance, the parts can be arranged to be at least one, or both, of physically complementary or electrically complementary. One or more than one graph of each part can be arranged to couple electrically with one or more than one other graph of any other part of the overall security structure.

Although any and all examples described in this application discuss providing at least one of power or communication lines to the device to be protected, example implementations are not limited to such an arrangement. Examples can be realised in which the power is supplied wirelessly. Wirelessly supplying power to the device may use inductive coupling. The inductive coupling can form part of the device. Alternatively, or additionally, any and all examples can be realised in which the inductive coupling is provided by an inductor coupled to the device. The inductor can be a printed inductor. The printed inductor can be formed from one or more than one doped region of base material according to example implementations. Furthermore, any and all examples can be realised in which the inductor for supplying power to the device can form a part of the security structure for protecting the device, or at least form a graph or graph element of such a structure. Consequently, if the inductor is damaged or otherwise compromised by unauthorised attacks or investigations, the information contained within the device may remain inaccessible due to the lack of, or insufficient levels of, power. Still further, communications with the device may, additionally or alternatively, be realised, in any or all examples, wirelessly in a manner similar to, for example, RF tags.

Figure 11:
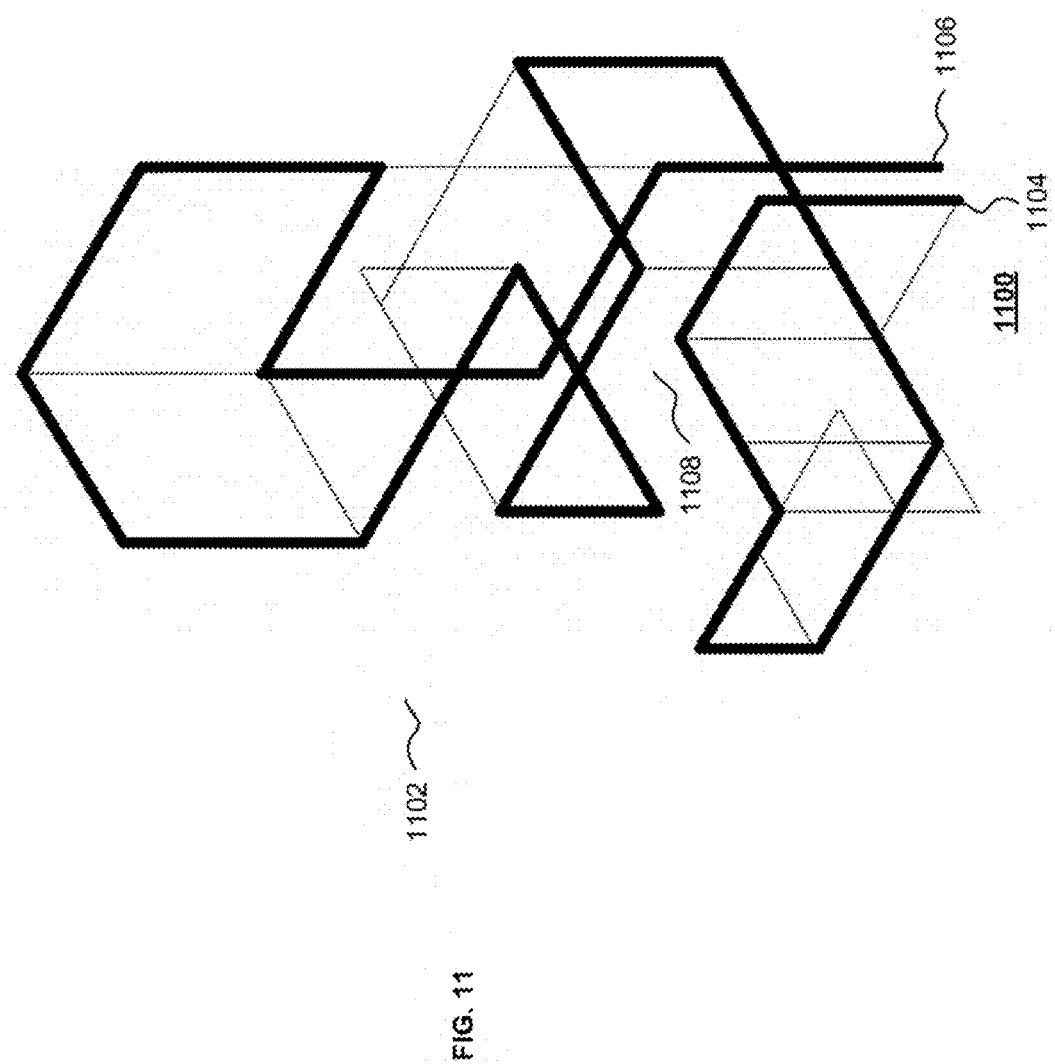
FIG. 11 is a view of a tamper evident security structure comprising a random graph according to examples.

Referring to FIG. 11, there is shown a view 1100 of a graph 1102 between a pair of contact points 1104, 1106. It can be appreciated that the graph 1102 is a three-dimensional graph. The three-dimensional graph is an example of a three-dimensional trace, that is, a three-dimensional graph of doped base material. It will be appreciated that the doped base material will have or exhibit at least one of a predetermined electrical attribute or a predetermined measurable electrical characteristic that is different to that, or those, of the undoped base material. The dashed lines have been included for illustrative purposes to provide a sense of the 3D nature of the three-dimensional graph 1102.

The graph 1102 can be printed using the above-described 3D printer 100 with or without accompanying or surrounding base material. Alternatively, or additionally, parts, or the whole, of the graph 1102 can be partially or wholly embedded within fused base material. It can be appreciated that the graph 1102 has, for illustrative purposes, a central region 1108 in which an information device, such as the above-described information device 1004, can be disposed.

Although the example graph 1102 has been depicted using doped regions or traces that are orthogonal to one another, example implementations are not limited to such an arrangement. Example implementations can be realised in which one or more than one doped region or trace is oriented other than orthogonally relative to at least one other one or more than one doped region or trace. For instance, example implementations can be realised in which a trace is oriented diagonally, or at some angle other than orthogonally, relative to one or more than one other doped region or trace. Therefore, very complex graphs can be realised. The graph 1102 between the two contact or end points 1104, 1106 can be realised using, for example, a random walk algorithm having an associated constraint. The associated constraint can relate to at least one of the predetermined electrical attribute or predetermined measurable electrical characteristic. For example, assuming that a unit length of doped base material or trace has an associated electrical attribute, fixing the overall length of such a random walk would give a series arrangement of a fixed number of doped base material unit length traces that will exhibit an overall predetermined electrical attribute or predetermined measurable electrical characteristic.

Therefore, example implementations can be realised in which multiple instances of the graph 1102 are used to define a protected volume or are used to protect an information device disposed within the central region 1108.

It will be appreciated, given the resolutions realization by 3D printing systems, such as, for example, the resolutions provided by the 3D printers available from Hewlett Packard Company, that the dimensions of doped regions and the spacing between doped regions can be accurately controlled to be of the order of 100 micrometers for any and all examples herein. Having such a resolution can lead to at least one, or both, of immensely complex or densely spaced graphs.

Figure 12:
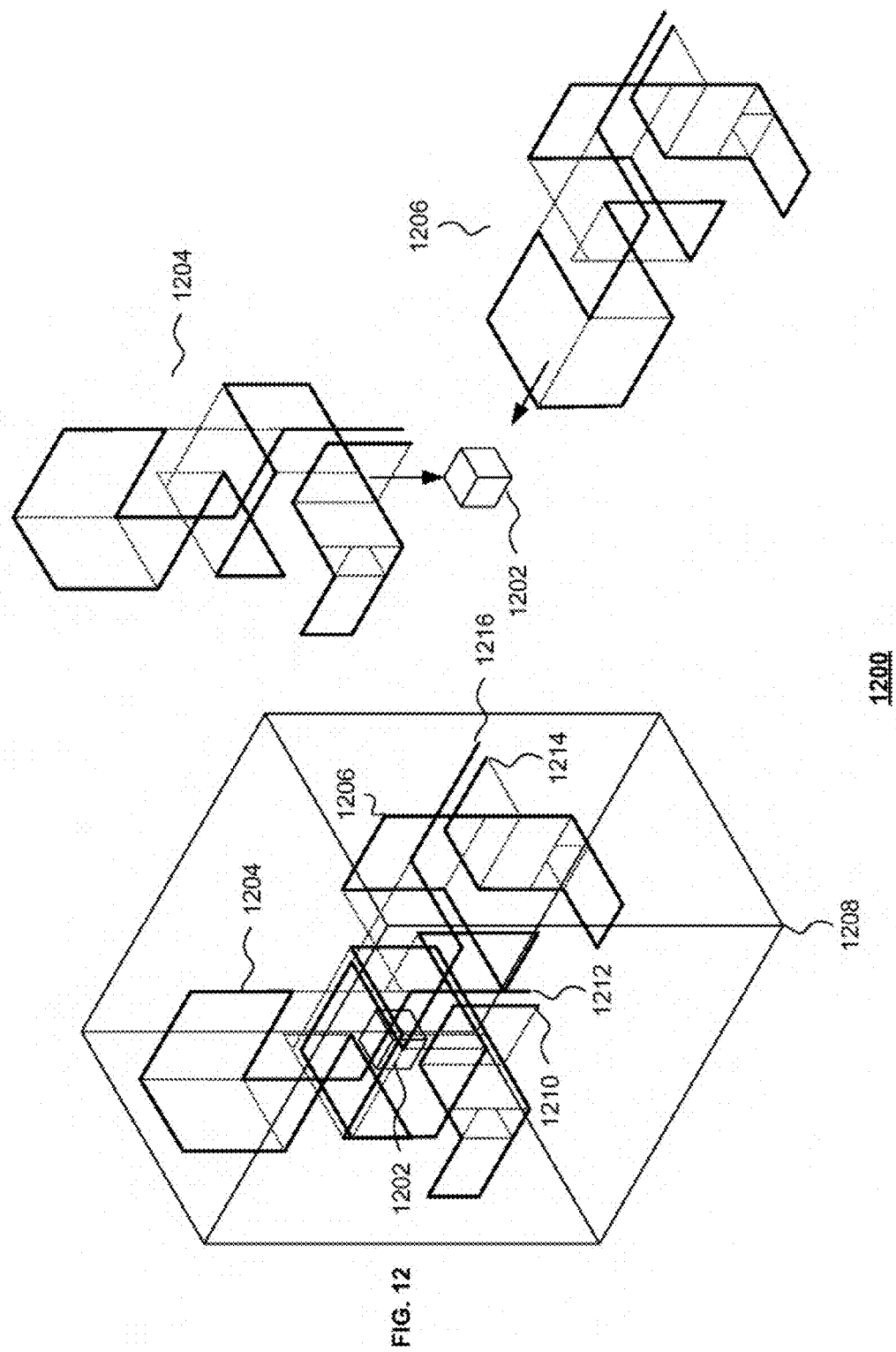
FIG. 12 is a view demonstrating a number of tamper evident security structure comprising random graphs protecting an information device according to examples.

FIG. 12 shows a view 1200 of the use of multiple instances of the graph 1102 to protect an information device 1202. The information device 1202 can be an example of any information device described in this application such as, for example, the above-described information device 1004. It can be appreciated that FIG. 12 shows two instances 1204, 1206 of the graph 1102 shown in, and/or described with reference to, FIG. 11. The information device 1202 and the two graphs 1204, 1206 are shown in a spaced apart relationship in the right hand side FIG. 12. The left-hand side of FIG. 12 shows the two graphs 1204, 1206 in an overlapping or partially nested relationship with the information device 1202 being centrally disposed relative to the two graphs 1204, 1206. The two graphs 1204, 1206 define a protected volume 1208 for protecting the information device 1202.

The protected volume 1208 is an example of a tamper evident security structure. It can be appreciated that contact or endpoints 1210, 1212 of one 1204 of the two graphs 1204, 1206 are accessible outside of the protected volume 1208. The contact or end points 1210, 1212 can be used to measure at least one of the conductance, resistance, inductance or capacitance, taken jointly and severally in any and all permutations, of the respective graph 1204. Any such measurements are an example of at least one, or both, of a predetermined electrical attribute or a predetermined measurable electrical characteristic.

Similarly, it can be appreciated that contact or endpoints 1214, 1216 of the other graph 1206 of the two graphs 1204, 1206 are accessible outside of the protected volume 1208. The contact or endpoints 1214, 1216 can be used to measure at least one of the conductance, resistance, inductance or capacitance, taken jointly and severally in any and all permutations, of the respective graph 1206. The two graphs 1204, 1206 can be at least partially or wholly embedded within 3D printed base material.

Figure 13:
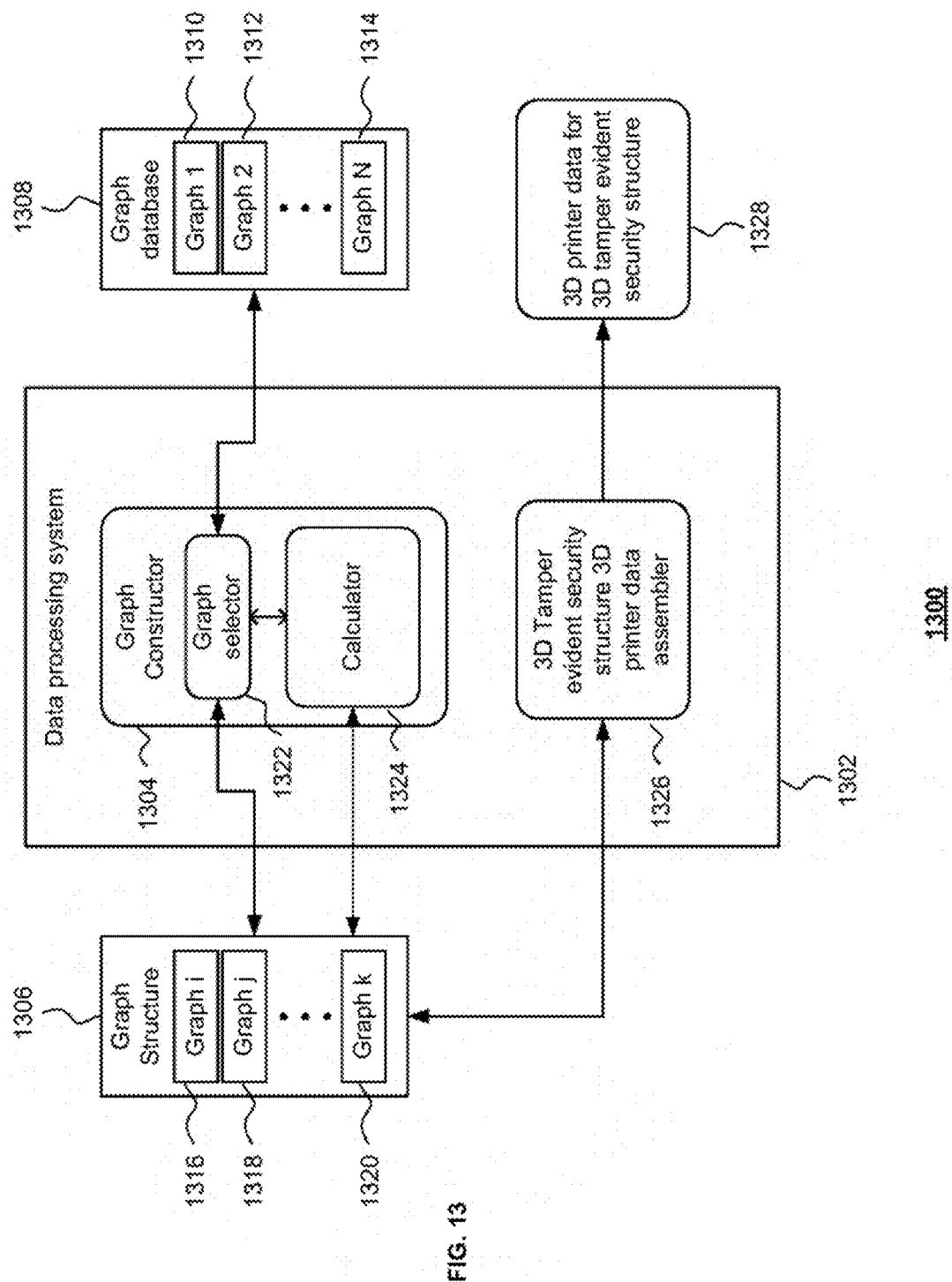
FIG. 13 depicts a data processing system according to examples.

Referring to FIG. 13, there is shown a view 1300 of a data processing system 1302 for producing a graph, such as, for example, any graph described herein, having at least one of a predetermined electrical attribute or predetermined measurable electrical characteristic. The data processing system 1302 comprises a graph constructor 1304. The graph constructor is arranged to collate data 1306 associated with a graph designed to exhibit at least one, or both, of a predetermined electrical attribute or a predetermined measurable electrical characteristic. The graph constructor 1304 can collate the data 1306 associated with a designed graph using a database 1308 of a number of graph elements. In the example illustrated, there are N such graph elements 1310 to 1314. Thus far, it can be appreciated that the collated data 1306 comprises a number 1316, 1318, 1320 of graph elements selected from the graph database 1308.

One or more than one graph element of the plurality of graph elements 1310 to 1314 have one or more than one associated respective predetermined electrical attribute. For example, the one or more than one associated respective predetermined electrical attribute can comprise at least one of an associated inductance, an associated capacitance, an associated conductance or an associated resistance, taken jointly and severally in any and all permutations.

The graph constructor 1304 comprises a graph selector 1322 responsible for selecting one or more than one graph element to be included in the collated data 1306 from the database 1308. The graph selector 1322 is responsive to a predetermined electrical attribute or characteristic calculator 1324. The predetermined electrical attribute or characteristic calculator 1324 is responsible for ensuring that the overall graph resulting from the collated graph data 1306 has at least one of a chosen or target predetermined electrical attribute or a chosen or target predetermined measurable electrical characteristic.

The data processing system 1302 may additionally, or alternatively, comprise an assembler 1326. The assembler 1326 is arranged to translate, or otherwise convert, the collated graph data 1306 to data or to a data structure 1328 that can be used by the 3D printer 100 to produce a 3D printed tamper evident security structure comprising the designed graph.

Any or all of the graph constructor 1304, graph selector 3022, predetermined electrical characteristic calculator 1324 or the assembler 1326 can be realised in the form of hardware, software or a combination of hardware and software. Suitably, example implementations provide machine-readable instructions, arranged when executed, for implementing any method or for realizing any system described in this application. Furthermore, example implementations provide machine-readable storage storing such machine-readable instructions.

Figure 14:
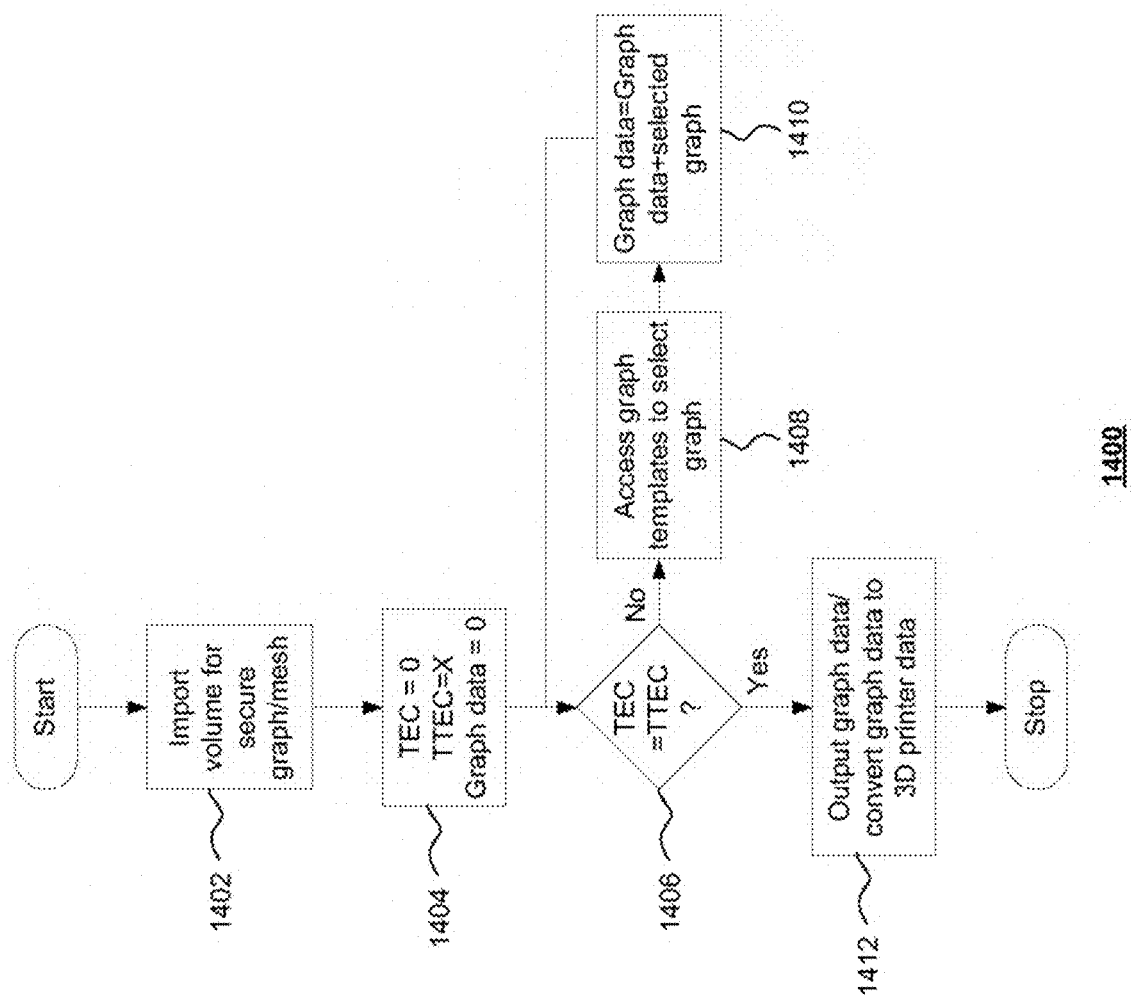
FIG. 14 illustrates a flow chart according to examples.

FIG. 14 depicts a flow chart 1400 showing an example implementation of processing undertaken by the graph constructor 1304. At 1402, data associated with a volume to be secured or otherwise protected using a graph or mesh is retrieved or accessed. For example, the data 1306 can relate to at least one, or both, of the dimensions of the volume or the position of an associated information device within the volume. A target electrical characteristic (TEC) is set to zero at 1404. A total target electrical characteristic (TTEC) Is set to at least one, or both, of a total predetermined electrical attribute or a target predetermined measurable electrical characteristic. In the illustrated example, the total target electrical characteristic is set to X, where X can represent an overall total electrical characteristic associated with at least one of a target conductance, a target resistance, a target inductance or a target capacitance, taken jointly and severally in any and all permutations.

A determination is made, at 1406, regarding whether or not the target electrical characteristic equals the total target electrical characteristic. If the determination at 1406 is negative, processing proceeds to 1408 where the graph database 1308 is accessed to select a graph element to be included in the graph data 1306 from the plurality of available graphs elements 1310, 1312, 1314. The selection of the graph element to be included can be random or deterministic. A deterministic selection can be responsive to at least one, or both, of the present target electrical characteristic or the total target electrical characteristic to select one or more than one graph element from the plurality of graph elements 1310 to 1314 to realise, at least in part, or in whole, the difference between the target electrical characteristic and the total target electrical characteristic. Having selected one or more than one graph element from the plurality of graph elements 1310 to 1314, the selected one or more than one graph element is added to the collated graph data 1306 at 1410. Thereafter, control returns to 1406. If the determination at 1406 is positive, the graph data 1306 representing a designed graph is output for further processing. The further processing may comprise, at 1412, converting the graph data 1306 into data or data structure 1328 usable by the 3D printer 100 to physically realise a 3D printed tamper evident security structure comprising the designed graph.

Figure 15:
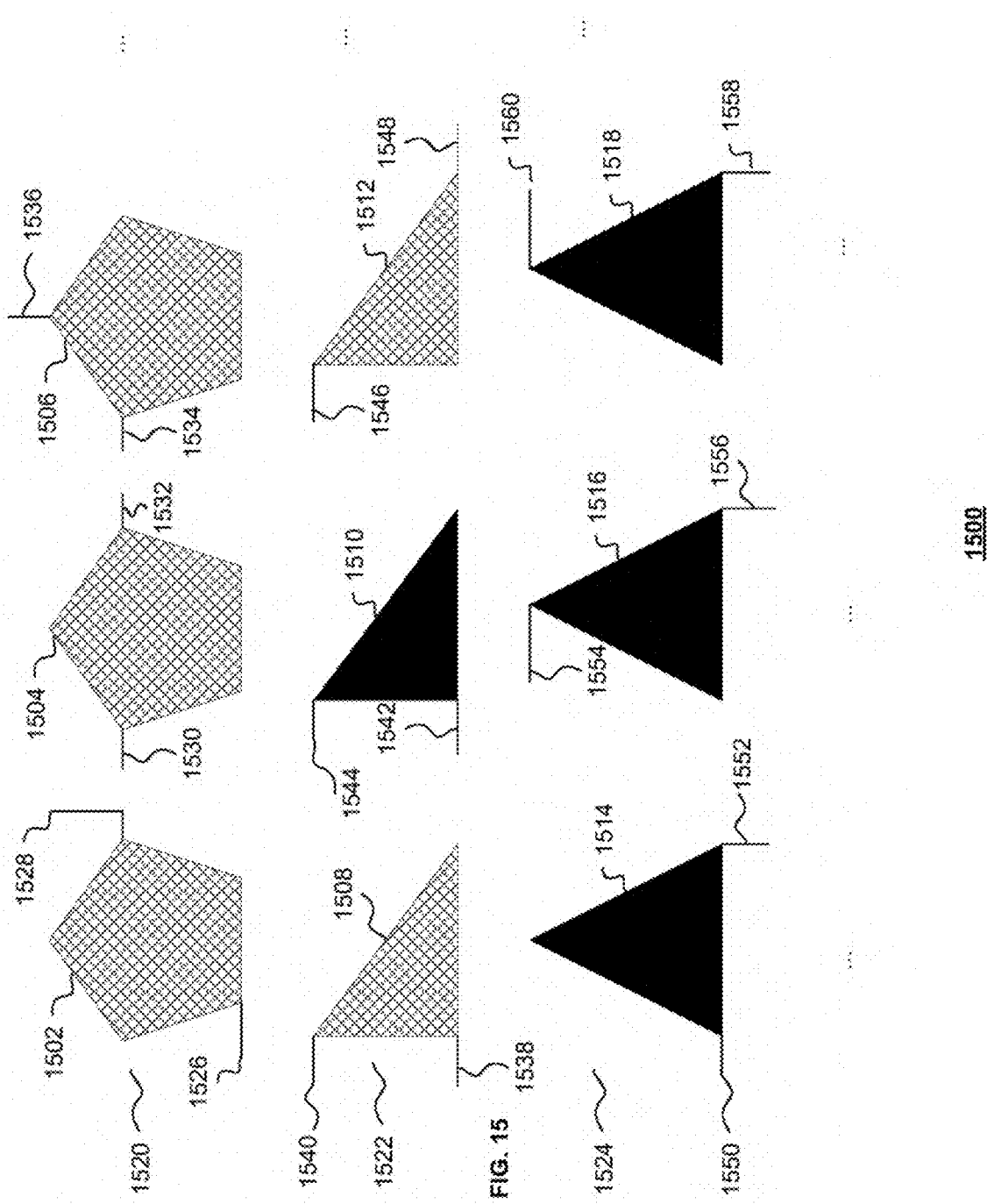
FIG. 15 shows a number of graphs according to examples.

Referring to FIG. 15 there is shown a view 1500 of a number of graphs 1502 to 1518. The graphs 1502 to 1518 can form part of, for example, the graph database 1308 as graph elements. It can be appreciated that the graphs 1502 to 1518 are formed from a number of repeated graphs. Each graph is realised in the form of a mesh. Each mesh will have one or more than one predetermined electrical attribute. The one or more than one predetermined electrical attribute can be realised by varying the locations of connect or endpoints to the graphs. Additionally, or alternatively, the one or more than one predetermined electrical attribute can be realised by varying the construction of the graph such as, for example, by varying any characteristic of the graph that influences an associated electrical attribute.

It can be appreciated that a number of sets of graphs are presented. In the example implementation, three such sets 1520, 1522, 1524 are presented. However, some other number of sets could be presented. It can be appreciated that the first set 1520 comprises a number of planar pentagon shaped meshes. The connect or end points 1526 to 1536 vary, which will give rise to different predetermined electrical attributes or characteristics between corresponding pairs of connect or end points.

Similarly, it can be appreciated that the second set 1522 comprises a number of right-angled triangle shaped meshes. The connect or end points 1538 to 1548 vary, which will give rise to different predetermined electrical attributes or characteristics between corresponding pairs of connect or end points.

Furthermore, it can be appreciated that the third set 1524 comprises a number of isosceles triangle shaped meshes. The connect or end points 1550 to 1560 vary, which will give rise to different predetermined electrical attributes or characteristics between corresponding pairs of connect or end points.

A set of graphs founded upon a given base shape, such as the pentagon, right-angled triangle or isosceles triangle can be realised by varying the locations of the connect or end points. Therefore, a set can comprise M graphs, where M is number of permutations of selecting two vertices, as corresponding to the connect or end points, from the total number of vertices for a given shaped graph.

The various graphs 1502 to 1518 in the database 1306 can be connected via their connect or end points to produce an overall graph having a desired or designed target predetermined measurable electrical characteristic or predetermined electrical attribute.

Figure 16:
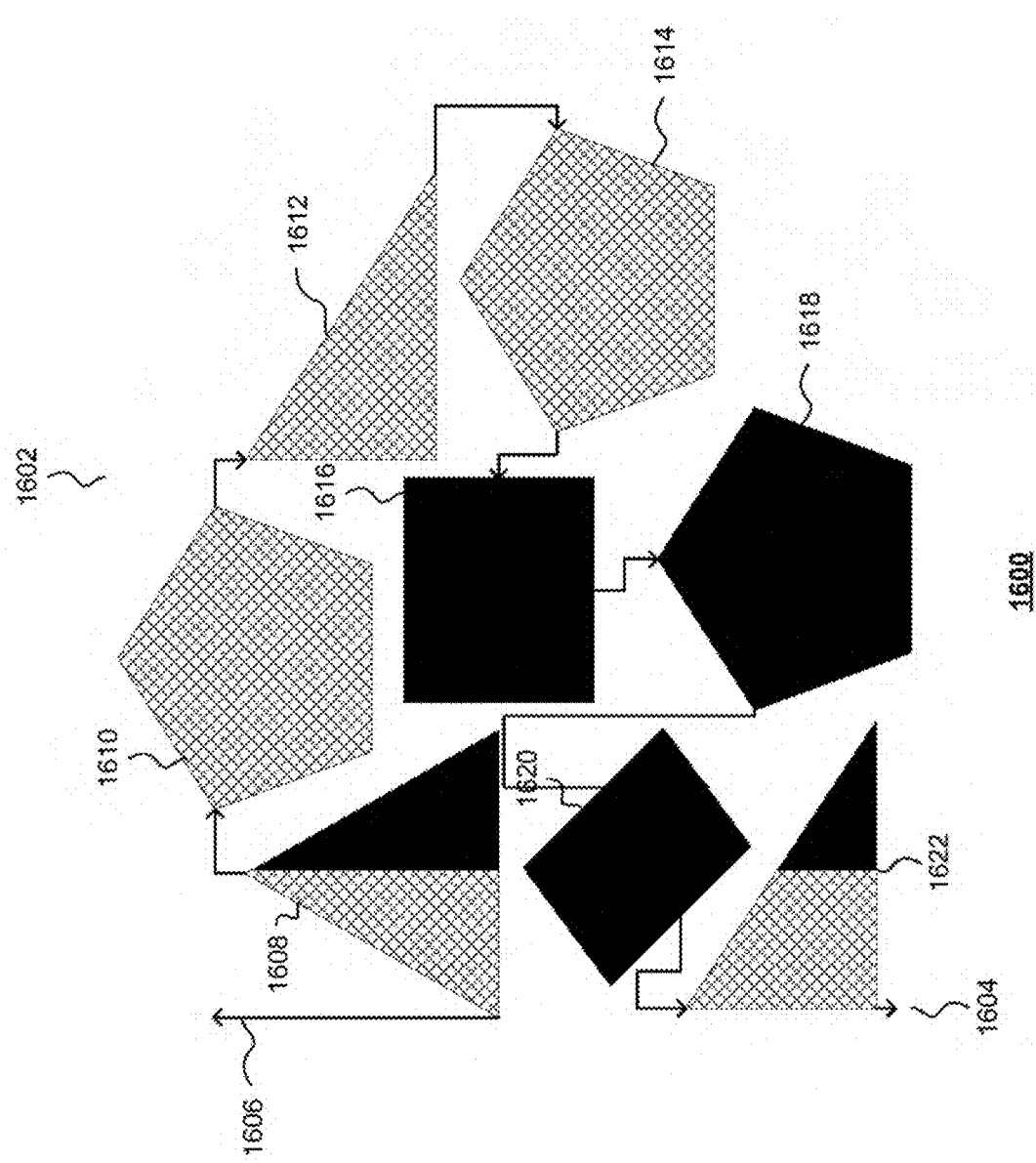
FIG. 16 illustrates an arrangement of graphs according to examples.

Referring to FIG. 16, there is shown a view 1600 of a series arrangement 1602, between two connect or end points 1604, 1606 of a plurality of graphs 1608 to 1622. It will be appreciated that the series arrangement of the graphs 1608 to 1622 comprises, in addition to the pentagon, right-angled triangle and isosceles triangle shaped graphs, two further graphs, which are a square graph 1616 and a rhombus shaped graph 1620. The graphs forming the series arrangement of graphs 1608 to 1622 have been selected to realise a respective predetermined electrical attribute or a predetermined measurable electrical characteristic between the two connect or end points 1604, 1606.

Figure 17:
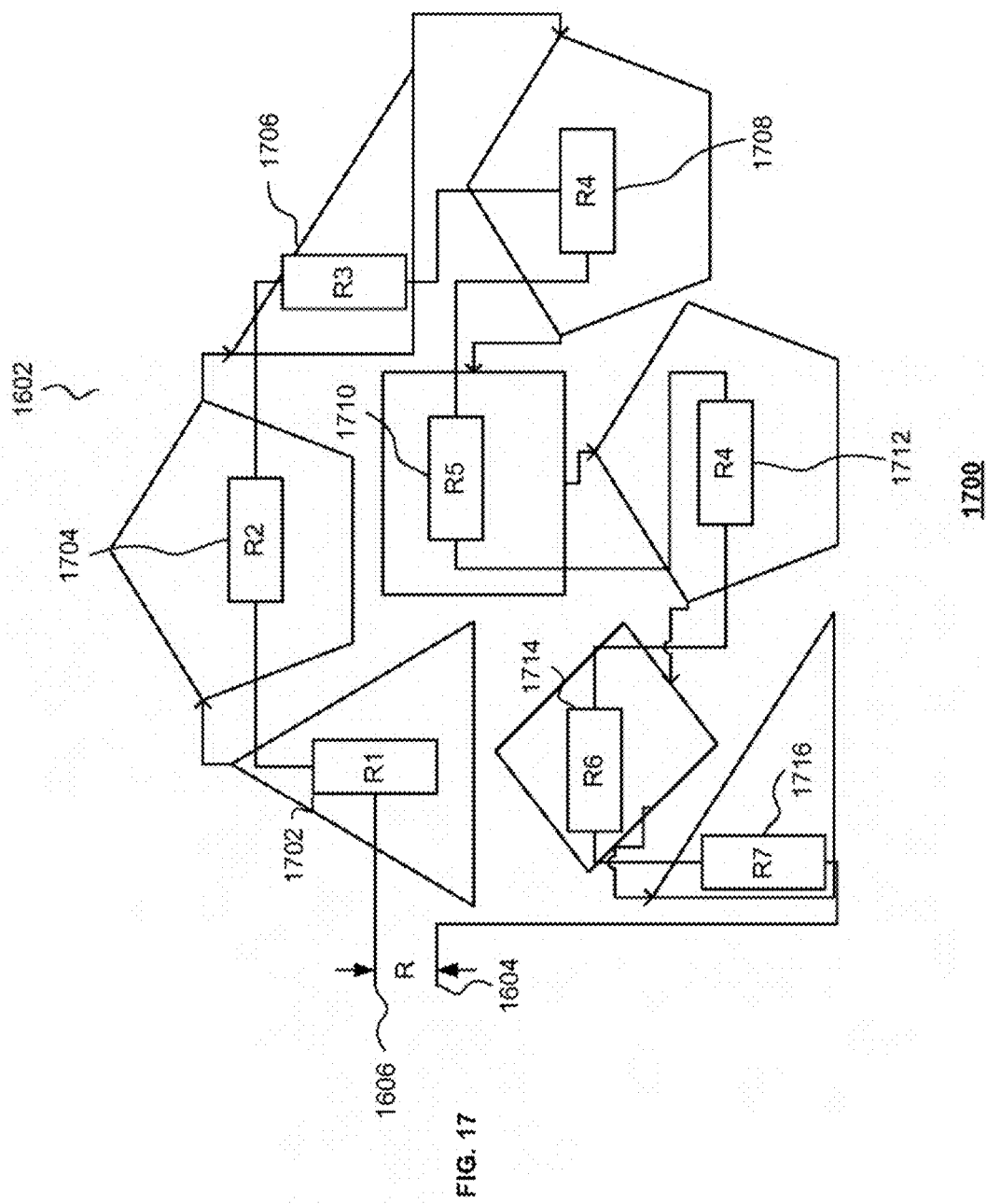
FIG. 17 illustrates an electrical equivalent to the arrangement depicted in FIG. 16 according to examples.

Referring to FIG. 17, there is shown a view 1700 that is the electrical equivalent to the series arrangement 1602 of graphs 1608 to 1622. The view 1700 depicts a number of resistors 1702 to 1716 reflecting the resistances that would be seen between the contact or end points of each of the graphs 1608 to 1622. The overall resistance presented between the contact or end points 1604, 1606 will be the series summation of all resistances of the resistors 1702 to 1716. Although the example implementation shown in FIG. 17 has used resistances as the predetermined electrical attribute, implementations are not limited to such an arrangement. Implementations can be realised in which the predetermined electrical attribute or predetermined measurable characteristic can comprise at least one of a conductance, resistance, inductance or capacitance, taken jointly and severally in any and all permutations.

Although some graphs in this application have been described as being planar, such as, for instances, the pentagonal, and triangular shapes shown in FIGS. 15 to 17 and other figures, examples can be realised in which they are other than planar. For instances, the graphs or graphs elements can be 3D structures and the images depicted in, for example, FIGS. 15 to 17 and other figures, can be cross-sectional or side views or 2D representations of such 3D structures.

Example implementations can be realised in which sets of traces are nested or at least partially nested. Each set can define a respective protected volume of an overall 3D printed tamper evident security structure. Alternatively, or additionally, each set can define a separate overall 3D printed tamper evident security structure. The sets of traces can be physically or electrically isolated. Additionally, or alternatively, the sets of traces can be physically or electrically coupled. Any such electrical coupling can be realised as at least one of conductively coupled, resistively coupled, inductively coupled or capacitively coupled taken jointly and severally in any and all permutations.

A predetermined electrical attribute can correspond to an electrical attribute of part of a graph such as, for example, a section of doped base material or a partial graph such as the graphs 1310 to 1314. A predetermined measurable electrical characteristic can relate to the overall electrical characteristic of the whole of a graph, or part of a graph, such as, for example, the frequency response of, for example, an LCR circuit or other graph, realised in the form of a graph, or the overall conductance, resistance, capacitance or inductance of an overall graph. A predetermined electrical attribute may relate to one electrical aspect of an overall graph such as, for example, the inductance, capacitance or resistance of an LCR circuit. In each case the inductance could represent a predetermined electrical attribute, a capacitance could represent a predetermined electrical attribute, a resistance could represent a predetermined electrical attribute or a conductance could represent a predetermined electrical attribute.

It is to be understood that this disclosure is not limited to the particular process stages and materials disclosed herein because such process stages and materials may vary. It is also to be understood that the terminology used in this disclosure is used for the purpose of describing particular examples. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, "liquid vehicle" or "printing liquid vehicle" refers to a liquid in which an additive is placed to form a composition.

The term "fusing agent" is used in this application to describe agents that may be applied to particulate build material, and that may assist in fusing the build material to form a layer of a 3D part. Heat may be used to fuse the build material, but the fusing agent can also assist in binding powder together, and/or in generating heat from electromagnetic energy. For example, a fusing composition or agent may include a fusing agent that can bind the build material together in preparation for heating to fuse the materials together, or may be an additive that becomes energized or heated when exposed to a frequency or frequencies of electromagnetic radiation. Any additive that assists in fusing particulate build material to form the 3D printed part can be used.

As used herein, "jet," "jettable," "jetting," or the like refers to compositions or agents that are ejected from a jetting architecture, such as an inkjet architecture. An inkjet architecture can include a thermal or piezo drop on demand architecture, as well as a continuous inkjet architecture. Additionally, such architectures can be configured to print varying drop sizes, for example, less than 50 picolitres (pl), less than 40 pl, less than 30 pl, less than 20 pl, less than 10 pl. In any or all examples, the drop size may be 1 to 40 pl, for example, 3 or 5 to 30 picolitres.

Concentrations, amounts, and other numerical data may be expressed or presented herein in a range format. It is to be understood that such a range format is used merely for convenience and brevity and thus should be interpreted flexibly to include not the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single one numerical value. Furthermore, such an interpretation should apply regardless of the breadth of the range or the characteristics being described.

Example Implementations can be realised using a method of 3-dimensional printing a printed part. The method can comprise printing a dopant composition or agent at selected locations on a layer of build material comprising polymer particles. The dopant composition or agent can comprise a dopant dispersed or dissolved in a liquid vehicle or carrier. Polymer particles at selected areas of the layer of build material are then fused to form a fused polymer layer comprising the dopant. The selected areas of the layer of build material include areas of the layer of build material that have not been printed with the dopant composition.

The method may further comprise forming a further layer of build material over the fused polymer layer comprising the dopant. Polymer particles at selected areas of the further layer of build material may be fused to form a fused polymer layer that is devoid of dopant. Alternatively, a dopant composition or agent may be printed on the further layer of build material prior to fusing. Polymer particles at selected areas of the further layer of build material may then be fused to form a further fused polymer layer comprising the dopant.

Example implementations can also comprise a 3-dimensional printing material set comprising a particulate build material comprising thermoplastic polymer particles. The set can comprise a dopant composition or agent comprising a dopant dispersed in a liquid carrier. The dopant can comprise particles (e.g. nanoparticles) that are selected from at least one of photoluminescent particles, dielectric particles, magnetic particles, ceramic particles, semi-conductor particles, and particles having, or being associated with, one or more than one of the above described predetermined electrical attributes or predetermined measureable electrical characteristics. The dopant composition or agent can also comprise a fusing composition or agent comprising a fusing agent capable of absorbing electromagnetic radiation to produce heat. In any or all examples, the thermoplastic polymer particles can have an average particle size of 10 to 100 μm.

In 3-dimensional printing, a layer of build material comprising polymer particles may be applied e.g. to a print platform. Selected areas of the layer of build material may then be fused to form a solid layer when a fusing energy is applied thereto. In any or all examples, a fusing composition or agent may be printed onto the selected areas of the layer of build material. Fusing agent in the fusing composition or agent may cause the build material in the selected areas to fuse to form a solid layer when a fusing energy is applied thereto. A new layer of build material may then be applied over the solid layer and the process repeated until a complete 3-D part is printed.

In the present application, it has been found that dopants can be introduced at specific locations within the printed part by printing. For example, because droplet size and print location can be controlled, compositions containing dopants can be printed in selected amounts at selected locations over the unfused build material. These selected locations may be selected by the controller 170. When the build material is fused, the dopants become incorporated into the layer at the selected locations. The fused build material containing or incorporating the dopant may be a doped region or dopant region. Dopants can be selected to provide at least one of conductance, resistance, inductance, capacitance, dielectric properties, photoluminescence, magnetism, elasticity or tensile strength at specific locations, taken jointly and severally in any and all permutations, allowing characteristics of the printed part to be tailored at one or more than one doped region of base or build material. The doped build material may be a doped composite material.

In any or all examples, the dopant composition or agent is printed droplet by droplet, wherein each droplet has a volume of 1 to 50 pl, for example, 2 to 30 pl or 5 to 20 pl. This can allow the dopant to be printed, for example, in patterns (e.g. intricate patterns) throughout the printed part.

In any or all examples, the dopant may become embedded in the printed part at selected locations. The dopant may be present at the outer surface of the printed part as well as at at least one location embedded within the printed part. In any or all examples, the dopant may be present at at least one location embedded within the printed part.

In any or all examples, the printed part can comprise regions comprising the dopant and regions in which the dopant is absent. The regions comprising the dopant may differ in at least one property from the regions in which the dopant is absent, wherein the at least one property is selected from at least one of conductivity, resistivity, inductivity, capacitance, dielectric permittivity, magnetic permeability, refractive index, photoluminescence, tensile strength or Young's modulus, taken jointly and severally in any and all permutations.

Any suitable build material may be employed in the present application. The build material can comprise polymer particles or powder such as, for example, thermoplastic polymer particles or powder. The particles may have an average particle size from 10 to 100 μm, for example, 20 to 80 μm. As used in the present application, "average" with respect to properties of particles refers to a number average unless otherwise specified. Accordingly, "average particle size" refers to a number average particle size. Additionally, "particle size" refers to the diameter of spherical particles, or to the longest dimension of non-spherical particles.

In any or all examples, the build material such as, for example, polymer particles, can have a variety of shapes, such as substantially spherical particles or irregularly-shaped particles. In any or all examples, the build material can be capable of being formed into 3D printed parts with a resolution of 10 to 100 μm, for example 20 to 80 μm. As used herein, "resolution" refers to the size of the smallest feature that can be formed on a 3D printed part. The build material can form layers from about 10 to about 100 μm thick, allowing the fused layers of the printed part to have roughly the same thickness. This can provide a resolution in the z-axis direction of about 10 to about 100 μm. The build material can also have a sufficiently small particle size and sufficiently regular particle shape to provide about 10 to 100 μm resolution along the x-axis and y-axis. Similarly, the spacing between features can be realised at the foregoing resolutions. Working at such resolutions allows complex and dense security structures to be realised.

In the present application, a dopant composition or agent can be used to introduce a dopant into the printed part. The dopant composition or agent may be printed onto a layer of build material prior to fusing. In other words, the dopant composition or agent may be printed onto unfused build material. By inkjet printing the dopant composition, the dopant composition or agent may be printed droplet-by-droplet at one or more than one doped region of base or build material. This positioning, in any and all examples, can be realised with an accuracy or at a resolution that depends on the accuracy or resolution of the 3D printer 100. Each droplet of dopant composition or agent may have a volume of less than 50 pl, less than 40 pl, less than 30 pl, less than 20 pl or less than 10 pl. In any or all examples, the droplet size may be 1 to 40 pl, for example, 2, 3, 4 or 5 to 30 pl, for instance, 2, 3, 4 or 5 to 20 pl or 2, 3, 4 or 5 to 10 pl. In any or all examples, the dopant composition or agent may be applied to unfused build material, for example, prior to application of any fusing composition or agent over the build material.

Once the dopant composition or agent is printed, the layer of build material may be fused at selected areas to a form a fused layer. Fusing may be performed under computer or digital control. These selected areas include areas that have been printed with the dopant composition or agent and areas that are free from the dopant composition. In this way, dopant may be incorporated into the resulting fused layer at pre-determined locations in a pre-determined pattern. This can allow the properties of the printed part to be controlled and varied. For example, by selecting appropriate dopants and tailoring their concentration and/or location at each layer of build material, properties such as electrical conductivity, heat conductivity, magnetic properties, mechanical properties (e.g. tensile strength) or optical properties can be tailored accordingly.

In any or all examples, fusing may be carried out by applying a fusing composition or agent to selected areas of the layer of build material and subjecting the build material to heat or electromagnetic radiation. The application of heat or electromagnetic radiation may cause the polymer of the build material to melt or soften in the areas where the fusing composition or agent has been applied.

The selected areas over which the fusing composition or agent is applied may include areas that are printed with a dopant composition or agent as well as areas that are unprinted or devoid of dopant composition.

The volume of dopant composition or agent that is printed on the particulate build material may be varied. For example, when using a single dopant composition or agent with one concentration of dopant, applying more printing liquid to a given region can result in a greater mass fraction of dopant. Increasing mass fraction of dopant can be carried out by ejecting higher drop volumes, ejecting more drops at a given region, or by printing multiple passes of printing liquid at a single region or location. In another example, multiple dopant compositions or agents can be prepared with different concentrations of dopants. The multiple dopant compositions or agents can likewise be printed at different printing liquid volumes as well for additional flexibility.

The concentration of dopant throughout the printed part may be varied gradually, for example, to create a concentration gradient of dopant in at least one region of the printed part. As a result, at least one property of the printed part may vary along a gradient. For example, the electrical conductivity, heat conductivity, magnetic properties or optical properties of the part may vary along a gradient in at least one region of the printed part. Alternatively, the dopant may be printed at a fixed concentration such that the concentration of dopant is substantially constant throughout all dopant-printed areas of the printed part.

When the dopant composition or agent is printed onto a layer of the build material, the dopant composition or agent can penetrate into build material. As a result, the dopant (e.g. particles, for instance, nanoparticles) can deposit on particles of the build material and/or deposit in the interstices between polymer particles. At large enough mass fractions, the microscopic physical properties of the one or more than one doped region of base or build material can be modified. By placing dopants, for example at predetermined concentration or at various concentrations (laterally and/or vertically) at a gradient along the structure being printed, parts having specific physical properties at specific locations can be produced. The concentration (e.g., mass fraction) of the dopant, or the pattern of dopant being printed, or both, can provide unique physical properties. Since these dopants can be printed digitally, they can be printed at any concentration and/or pattern desired to obtain a physical property (e.g. optical, photoluminescent, magnetic, or electrical properties), for instance, at one or more specific locations within the printed part.

In any, or all examples, the dopant composition or agent can include a fusing agent. Additionally, or alternatively, in any, or all, examples the fusing composition or agent can comprise one or more than one dopant. In other examples, printing liquid can be printed with a separate fusing composition or agent to facilitate fusing of the thermoplastic polymer. In either case, the temperature of the build material can be raised above the melting or softening point of the thermoplastic polymer so as to facilitate the fusing process.

Any suitable dopant may be employed. In any or all examples, the dopant takes the form of solid particles, for instance, nanoparticles, carbon black, carbon, graphene or other particles with desirable electrical attributes. These particles may be dispersed in a liquid vehicle or carrier, for example, in the presence of a surfactant. Suitable particles can photoluminescent particles, dielectric particles, magnetic particles, ceramic particles, semiconductor particles, electrically-conducting particles polymer particles, taken jointly and severally in any and all permutations.

Suitable dopant particles may have a particle size in the range of 1 to 200 nm. Nanoparticles may have a particle size of 1 to 100 nm. In any or all examples, nanoparticles having a particle size of 1 to 80 nm, for example, 2 to 50 nm or 3 to 20 nm are employed.

The dopant may be present in the dopant composition or agent in an amount of 0.01 wt % to 10 wt %. In one example, the concentration of dopant in the dopant composition or agent can be from 0.05 wt % to 8 wt %. In another example, the concentration can be from 0.1 wt % to 5 wt %. In yet another example, the concentration can be from 0.1 wt % to 3 wt %. In a particular example, the concentration can be from 0.5 wt % to 1.5 wt %.

In any or all examples, the dopants can be dielectric particles (e.g. nanoparticles). Dielectric particles may be used to alter the dielectric properties (e.g. capacitance) of a printed part at pre-determined locations. Due to the physical relationship between a material's dielectric constant and its refractive index, the optical properties (e.g. refractive index) of a printed part may be varied by incorporating dielectric nanoparticles into the printed part at specific locations. Thus, by printing dielectric particles at specific locations, the local refractive index of one or more than one doped region of base or build material can be varied.

The dopant composition or agent may comprise a liquid vehicle. In any or all examples, the liquid vehicle formulation can comprise, or be, water.

Where a fusing composition or agent is employed, the fusing composition or agent (or "fusing agent") can contain a fusing agent that is capable of absorbing electromagnetic radiation to produce heat. The fusing agent can be colored or colorless. In any or all examples, the fusing agent can be carbon black, near-infrared absorbing dyes, near-infrared absorbing pigments, tungsten bronzes, molybdenum bronzes, metal nanoparticles, or combinations thereof.

The fusing composition or agent may be printed onto selected areas of the layer of build material prior to fusing. The fusing composition or agent may be applied to areas of the layer of build material that have been printed with dopant composition, as well as to areas of the layer of build material that have not been printed with dopant composition. The fusing agent can have a temperature boosting capacity sufficient to increase the temperature of the polymer powder above the melting or softening point of the polymer powder. When the fusing agent is printed on a portion of the polymer powder, the fusing agent can heat the printed portion to a temperature at or above the melting or softening point, while the portions of the polymer powder unprinted with fusing agent remain below the melting or softening point. This can allow the formation of a solid 3D printed part, while the loose powder can be easily separated from the finished printed part. Any dopant printed on the polymer powder prior to application of the fusing composition or agent may also become incorporated into the printed part.

The fusing agent may be an infrared absorbing, for example, a near-infrared absorbing dye.

The fusing agent may also be an infrared absorbing, for example, a near-infrared absorbing pigment.

In any or all examples, the fusing agent can have a black or gray color due to the use of carbon black as the fusing agent. However, in other examples the fusing agent can be colorless or nearly colorless. The concentration of the fusing agent can be adjusted to provide a fusing agent in which the visible color of the fusing agent is not substantially altered by the fusing agent.

The fusing composition or agent may comprise a liquid vehicle. The fusing agent may be dispersed in the liquid vehicle. In any or all examples, the liquid vehicle formulation can comprise, or be, water.

Example implementations can be realised in which a dopant composition or agent and a fusing composition or agent are combined so that a single composition can perform the function of being a dopant vehicle or carrier and a fusing agent. Therefore, examples can be realised in which any and all dopant compositions or agents are combined with any and all fusing composition or agents, jointly and severally in any and all permutations. For example, an agent comprising carbon black could function as both a dopant agent and fusing agent.

In addition to dopants, colorants may be applied to the build material. Colorant may be applied to at least the outer surface of the printed part. The colorant may be visible to the naked eye and may be employed in sufficient amounts to impart a discernible colour to the printed part. The colorant may be a visible dye or a visible pigment.

Such colorants may be applied by printing an inkjet printing liquid composition comprising a colorant onto the build material. The colored inkjet printing liquid may be applied to at least portions of a layer of unfused polymer particles to impart colour to the printed part. A colored printing liquid jet printing liquid can include any suitable colorant, including dyes and/or pigments. This can allow for printing of full-color 3-dimensional parts. Suitable inkjet printing liquids include cyan, magenta, yellow, and black inks. Coloured inkjet printing liquid compositions may be provided together with the build material, dopant composition or agent and fusing composition or agent as part of the 3-dimensional printing material set.

Alternatively or additionally, colorants may be incorporated into the dopant composition or agent and/or fusing composition or agent described above.

Although one or more than one of the examples in this application relate to graphs such as, for example, the random trace of FIG. 11 or the meshes of FIGS. 15, 16 or 16, example implementations are not limited thereto. Examples can be realised in which the graphs are continuous structures exhibiting at least one of the predetermined electrical attribute or the predetermined measurable electrical characteristic. Such continuous structures can comprise at least one of line or trace structures, planar and non-planar structures or any other continuous structure.

Although any or all security structures described in this application have referred to protecting an information device, examples are not limited to such arrangements. Examples can be realised in which the security structures protect some other feature. For instances, the feature to be protected could be a detectable 3D printed feature created by the 3D printer 100 as part of the process of creating the tamper evident security structure. For example, the feature could comprise an LCR circuit, formed from printed graphs, that has a particular frequency response. Examples can be realised in which the security structure may form part such a printed circuit such that comprising the security structure could lead to a change in the frequency response.

Implementations can be realised in accordance with the following examples:

Example 1: A method of printing, or creating, a 3D printed tamper evident security structure, optionally, for protecting a feature, such as, for instance, a 3D printed feature or an information device to be surrounded by the structure; the method comprising repeatedly depositing a layer of build material; doping one or more than one region of the layer of build material using a dopant to influence a respective electrical attribute of one or more than one region associated with a graph of the structure; and agglomerating one or more than one selected portion of the layer of the build material, including at least the doped one or more than one region of the layer of build material, to form progressively the graph with a predetermined measurable electrical characteristic.

Example 2: The method of example 1 in which the doping is responsive to a data associated with the graph of the structure that defines the one or more than one region associated with the graph.

Example 3: The method of example 2 in which the data associated with the graph comprises data defining at least one of a unique, different, or random graph having the predetermined electrical characteristic.

Example 4: The method of any preceding example, wherein said doping comprises: doping a first one or more than one region of the layer of build material using the dopant in one or more than one region associated with a first graph having a respective predetermined electrical characteristic; and doping a second one or more than one region of the layer of build material using the dopant in one or more than one region associated with a second graph having a respective predetermined electrical characteristic.

Example 5: The method of example 4, in which the first graph has a respective graph lay out and the second graph has a respective graph lay out.

Example 6: The method of example 4, in which the first graph has a respective graph lay out and the second graph has a respective graph lay out that is different to the first graph lay out.

Example 7: The method of any of examples 4 to 6, in which the first and second graphs are at least one of electrically coupled, resistively coupled, inductively coupled, capacitively coupled or electrically isolated, taken jointly and severally in any and all permutations.

Example 8: The method of any of examples 4 to 7, in which the first and second graphs are electrically isolated.

Example 9: The method of any of examples 4 to 8, in which the first and second graphs are at least partially nested and, optionally, wholly nested.

Example 10: The method of any preceding example, in which the doping comprises printing the dopant using a predetermined volume of an agent.

Example 11: The method of example 10, in which printing the dopant using a predetermined volume of an agent comprises volumes of at least one of 50 picolitres or less, 40 picolitres or less, 30 picolitres of less, 20 picolitres or less or 10 picolitres of less.

Example 12: The method of any preceding example, in which the dopant is at least one of carbon, carbon black, carbon fibres, graphene or nano-particles, taken jointly and severally in any and all permutations.

Example, 13: The method of any preceding example, in which the graph is arranged to be a non-planar graph.

Example 14: The method of any preceding example, in which the graph is arranged to span a respective volume.

Example 15: The method of example 14, in which the graph is arranged to span the respective volume using at least one of a unique or random 3D pattern of doped regions having the predetermined electrical characteristic.

Example 16: A 3D printed tamper evident security structure, optionally for housing, a feature, such as, for instance, a 3D printed feature or an information device; the structure comprising an agglomerated base carrier material bearing a dopant, having at least one, or both, of a predetermined electrical attribute or predetermined measurable electrical characteristic, in one or more than one doped region forming at least a first graph; the first graph defining the security structure with a predetermined electrical characteristic.

Example 17: The structure of example 16, in which at least one, or both, of the predetermined electrical attribute or the predetermined measurable electrical characteristic comprises at least one of an associated resistance, conductance, inductance or capacitance, taken jointly and severally in any and all permutations.

Example 18: The structure of either of examples 16 and 17, in which the first graph is at least one of a unique or random graph having the predetermined measurable electrical characteristic or predetermined electrical attribute.

Example, 19: The structure of any of examples 16 to 18, in which the agglomerated base carrier material bearing the dopant, having at least one, or both, of a predetermined electrical characteristic or a predetermined measurable electrical characteristic, in one or more than one doped region forming at least a first graph comprises the first graph and at least a second graph.

Example 20: The structure of example 19, in which the first and second graphs both exhibit the at least one, or both, predetermined electrical attribute or the predetermined measurable electrical characteristic.

Example 21: The structure of example 19, in which the first graph has the predetermined electrical characteristic and the second graph has a respective predetermined electrical characteristic that is different to the predetermined electrical characteristic of the first graph.

Example 22: The structure of any of examples 19 to 21, in which the first graph has a respective graph lay out and the second graph has a respective graph lay out that is different to the first graph lay out.

Example 23: The structure of any of examples 19 to 22, in which the first and second graphs are at least one of conductively coupled, resistively coupled, inductively coupled, capacitively coupled or electrically isolated, taken jointly and severally in any and all permutations.

Example 24: The structure of any of examples 19 to 23, in which the first and second graphs are at least one of at least partially, or wholly, nested or interdigitated.

Example 25: The structure of any of examples 16 to 24, in which said at least a first graph has predetermined dimensions.

Example 26: The structure of example 25, in which the predetermined dimensions are associated with at least one of a predetermined volume of an electrically conductive agent, a predetermined width of an electrically conductive agent, a predetermined length of an electrically conductive agent or a predetermined height of an electrically conductive agent, taken jointly and severally in any and all permutations.

Example 27: The structure of any of examples 16 to 26, in which the one or more than one doped region comprises a dopant selected from at least one of carbon, carbon black, nanoparticles or graphene.

Example 28: The structure of any of examples 16 to 27, in which graph is arranged to be a non-planar graph.

Example 29: The structure of any of examples 16 to 27, in which the graph is arranged to span a respective volume.

Example 30: The structure of example 29, in which the graph is arranged to span the respective volume using at least one of a unique or random 3D pattern of doped regions having the predetermined electrical characteristic.

Example 31: The structure of example 29, in which the respective volume comprises a solid volume of base material but for the one or more than one doped region.

Example 32: The structure of any of examples 16 to 31, comprising an information device.

Example 33: The structure of any of examples 16 to 32, in which the graph comprises an enclosure for housing the information device.

Example 34: The structure of any of examples 16 to 33, in which the graph comprises a number of graphs.

Example 35: The structure of any of examples 16 to 34, in which the graph comprises a number of nested graphs.

Example 36: The structure of any of examples 16 to 35, in which the graph comprises a plurality of layers.

Example 37: The structure of example 36, in which each of the plurality of layers are adjacent layers.

Example 38: The structure of example 37, in which two or more than two of the layers exhibit a predetermined capacitance or mutual inductance.

Example 39: A tamper evident security structure, optionally, for protecting a feature, such as, for instance, a 3D printed feature or an information device; the structure comprising a volume of a base material comprising an enclosure for the feature, the volume of base material having embedded therein one or more than one region having a predetermined electrical attribute that is different to a corresponding electrical attribute of the volume of base material; the one or more than one region forming a graph exhibiting a predetermined measureable electrical characteristic.

Example 40: The structure of example 39, in which the one or more than one region having a predetermined electrical attribute comprises one or more regions of base material doped with a dopant influencing or associated with the predetermined electrical attribute.

Example 41: The structure of any of examples 39 to 40, in which the one or more than one region having a predetermined electrical attribute comprises at least one structure having the predetermined electrical attribute.

Example 42: The structure of example 41, in which the at least one structure having the predetermined electrical attribute comprises a number of structures having respective predetermined electrical attributes.

Example 43: The structure of example 42, in which the number of structures having respective predetermined electrical attributes comprises one or more structures having different predetermined electrical attributes to one or more than one structure of the number of structures having respective predetermined electrical attributes.

Example 44: The structure of either of examples 42 and 43, in which the number of structures having respective predetermined electrical attributes comprises one or more structures having the same predetermined attributes as one or more than one structure of the number of structures having respective predetermined electrical attributes.

Example 45: The structure of any of examples 42 to 44, in which the number of structures having respective predetermined electrical attributes comprises one or more structures having different structures to one or more than one structure of the number of structures.

Example 46: The structure of any of examples 42 to 45, in which the number of structures having respective predetermined electrical attributes comprises one or more structures having the same structure as one or more than one structure of the number of structures.

Example 47: The structures of any of examples 41 to 46, in which the at least one structure having the predetermined electrical attribute comprises a sub-graph or graph element having the predetermined electrical attribute.

Example 48: The structure of any of examples 39 to 47, in which the predetermined electrical attribute comprises at least one of conductance, resistance, inductance or capacitance, taken jointly and severally in any and all permutations.

Example, 49: The structure of any of examples 39 to 48, in which the predetermined electrical characteristic comprises at least one of conductance, resistance, inductance or capacitance, taken jointly and severally in any and all permutations.

Example 50: The structure of any of examples 39 to 49, in which the volume of the base material comprises a solid volume of a base material, optionally comprising an enclosure for feature, the solid volume of base material having embedded therein the one or more than one region having a predetermined electrical attribute that is different to a corresponding electrical attribute of the solid volume of base material; the one or more than one region forming the graph exhibiting a predetermined measureable electrical characteristic or the predetermined electrical attribute.

Example 51: The structure of any of examples 39 to 50, in which the graph comprises one or more than one random walk trace between two predetermined points; the random walk trace exhibiting the predetermined measurable electrical characteristic.

Example 52: The structure of any of examples 39 to 51, in which the graph comprises multiple random walk traces between respective pairs of predetermined points; the random walk traces exhibiting the respective predetermined measurable electrical characteristics.

Example 53: The structure of example 52, in which the respective predetermined measurable electrical characteristics exhibit the same predetermined measurable electrical characteristic.

Example 54: The structure of any preceding example, in which the graph comprises at least one of: one or more than one trace exhibiting the predetermined electrical characteristic; or one or more than one graph exhibiting the predetermined electrical characteristic.

Example 55: Machine executable instructions arranged, when executed, to perform a method of any of examples 1 to 15.

Example 56: A data structure comprising data for controlling a 3D printer to produce a 3D printed tamper evident security structure of any of examples 16 to 54.

Example 57: A controller comprising respective circuitry to implement one or more than one, or all, features of any of at least one, or both, of the methods described herein or expressed in any of the above examples.

The invention claimed is:

1. A method of printing a tamper evident security element on a three-dimensional (3D) structure for protecting a feature, the method comprising:
depositing a layer of build material on a surface of the 3D structure;
doping selective regions of the layer of the build material using a dopant to create a doped graphic line covering the surface of the 3D structure
wherein the doping comprises:
doping a first region of the layer of the build material using the dopant to create a first portion of the doped graphic line having a horizontal serpentine configuration over the first region; and
doping a second region of the layer of the build material using the dopant to create a second portion of the doped graphic line having a vertical serpentine configuration over the second region; and
fusing the doped graphic line in the serpentine configuration covering the surface of the 3D structure to form the tamper evident security element on the surface of the 3D structure, wherein the doped graphic line on the surface of the 3D structure has a predetermined electrical measurement, and a change in the predetermined electrical measurement of the doped graphic line on the surface of the 3D structure indicates the 3D structure has been tampered.

2. The method of claim 1, wherein the doping is responsive to a graph data.

3. The method of claim 2, wherein the graph data is selected from a plurality of graphs to be printed on the surface of the 3D structure.

4. The method of claim 1, wherein the first portion of the doped graphic line is associated with first graph data and the second portion of the doped graphic line is associated with second graph data.

5. The method of claim 1, wherein one end of the first portion of the doped graphic line is connected to one end of the second portion of the doped graphic line to create one graph having the predetermined electrical measurement.

6. The method of claim 1, wherein the first and second portions of the doped graphic line are electrically coupled to each other.

7. The method of claim 1, wherein the first and second portions of the doped graphic line are electrically isolated from each other.

8. The method of claim 1, wherein the first and second portions of the doped graphic line are overlapping each other.

9. The method of claim 1, wherein fusing the doped graphic line includes:

depositing a fusing agent onto the layer of the build material that includes the doped graphic line; and heating the layer of the build material to cause the fusing agent to fuse the doped graphic line.

10. The method of claim 1, further comprising:

depositing a second layer of the build material on a second surface of the 3D structure;

doping selective regions of the second layer of the build material using the dopant to create a second doped graphic line in the serpentine configuration covering the second surface of the 3D structure; and fusing the second doped graphic line on the second surface of the 3D structure.

11. The method of claim 1, wherein the dopant is at least one of carbon, nanoparticles or graphene.

* * * * *